US009328890B2

(12) United States Patent
Takahira et al.

(10) Patent No.: US 9,328,890 B2
(45) Date of Patent: May 3, 2016

(54) LIGHT PROJECTING DEVICE AND VEHICULAR HEADLAMP

(71) Applicant: Sharp Kabushiki Kaisha, Osaka-shi (JP)

(72) Inventors: Yoshiyuki Takahira, Osaka (JP); Yosuke Maemura, Osaka (JP); Koji Takahashi, Osaka (JP); Kensei Toyota, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

(21) Appl. No.: 14/793,556

(22) Filed: Jul. 7, 2015

(65) Prior Publication Data

US 2015/0308648 A1    Oct. 29, 2015

Related U.S. Application Data

(63) Continuation of application No. 13/533,550, filed on Jun. 26, 2012, now Pat. No. 9,108,568.

(30) Foreign Application Priority Data

Jun. 29, 2011 (JP) ................ 2011-144818
Jun. 29, 2011 (JP) ................ 2011-144821
Jan. 18, 2012 (JP) ................ 2012-008483

(51) Int. Cl.
*B60Q 1/04* (2006.01)
*F21S 8/10* (2006.01)
(Continued)

(52) U.S. Cl.
CPC ........... *F21S 48/1747* (2013.01); *B60Q 1/0023* (2013.01); *B60Q 1/143* (2013.01);
(Continued)

(58) Field of Classification Search
CPC ............... F21S 48/10–48/11; F21S 48/1323; B60Q 1/04; B60Q 1/143; B60Q 2300/45; B60Q 1/0023
USPC ............................................ 362/507
See application file for complete search history.

(56) References Cited

U.S. PATENT DOCUMENTS 5,535,230 A    7/1996    Abe
5,962,971 A    10/1999   Chen
(Continued)

FOREIGN PATENT DOCUMENTS

CN    1661825    8/2005
CN    1676986    10/2005
(Continued)

OTHER PUBLICATIONS

Takahashi, K., et al. "'Laser Headlight' for Next Generation Automotive Lighting" Proceeding for 9th International Symposium on Automotive Lighting. Darmstadt, Germany. Sep. 26-28, 2011. 271-283 (with cover page).
(Continued)

*Primary Examiner* — Karabi Guharay
(74) *Attorney, Agent, or Firm* — Morrison & Foerster LLP

(57) ABSTRACT

A light-projecting device according to the present invention includes a plurality of light source units including (i) a light emitting section that emits light upon receiving a laser beam and (ii) a reflector. Each of the light source units project light to a corresponding one of light-projected spots which is a region to which light is projected in an illuminated region in a partitioning manner, and the illuminated region is formed by combining a plurality of the light-projected spot.

4 Claims, 24 Drawing Sheets

(51) Int. Cl.
  *B60Q 1/00*    (2006.01)
  *B60Q 1/14*    (2006.01)
  *B60Q 11/00*   (2006.01)
  *F21Y 101/02*  (2006.01)

(52) U.S. Cl.
  CPC ............ *B60Q 11/005* (2013.01); *F21S 48/115* (2013.01); *F21S 48/1154* (2013.01); *F21S 48/1159* (2013.01); *F21S 48/1225* (2013.01); *F21S 48/1323* (2013.01); *B60Q 2300/054* (2013.01); *B60Q 2300/056* (2013.01); *B60Q 2300/45* (2013.01); *F21Y 2101/02* (2013.01)

(56) References Cited

U.S. PATENT DOCUMENTS

| | | | |
|---|---|---|---|
| 6,412,971 | B1 | 7/2002 | Wojnarowski et al. |
| 7,084,435 | B2 | 8/2006 | Sugimoto et al. |
| 7,131,759 | B2 | 11/2006 | Ishida et al. |
| 7,144,131 | B2 | 12/2006 | Rains |
| 7,165,871 | B2 | 1/2007 | Takeda et al. |
| 7,168,837 | B2 | 1/2007 | Ishida et al. |
| 7,232,247 | B2 | 6/2007 | Yatsuda et al. |
| 7,282,748 | B2 | 10/2007 | Takeda et al. |
| 7,382,091 | B2 | 6/2008 | Chen et al. |
| 7,388,232 | B2 | 6/2008 | Suehiro et al. |
| 7,810,954 | B2 | 10/2010 | Kolodin |
| 8,342,720 | B2 | 1/2013 | Harada et al. |
| 8,348,458 | B2 | 1/2013 | Holten et al. |
| 2001/0028565 | A1 | 10/2001 | Ishida |
| 2002/0015308 | A1 | 2/2002 | Naganawa et al. |
| 2004/0120155 | A1 | 6/2004 | Suenaga |
| 2004/0145895 | A1 | 7/2004 | Ouderkirk et al. |
| 2004/0184279 | A1 | 9/2004 | Molto et al. |
| 2004/0223337 | A1 | 11/2004 | Ishida |
| 2005/0105301 | A1 | 5/2005 | Takeda et al. |
| 2005/0157508 | A1 | 7/2005 | Takeda et al. |
| 2005/0231971 | A1 | 10/2005 | Ishida |
| 2005/0236628 | A1 | 10/2005 | Matsuura |
| 2006/0139926 | A1 | 6/2006 | Morioka et al. |
| 2007/0080362 | A1 | 4/2007 | Scotch et al. |
| 2007/0201241 | A1 | 8/2007 | Komatsu |
| 2008/0007961 | A1 | 1/2008 | Mochizuki et al. |
| 2008/0239746 | A1 | 10/2008 | Wuller et al. |
| 2009/0003400 | A1 | 1/2009 | Nagahama et al. |
| 2009/0046474 | A1 | 2/2009 | Sato et al. |
| 2009/0231866 | A1 | 9/2009 | Yamamura |
| 2009/0231874 | A1 | 9/2009 | Kishimoto et al. |
| 2009/0273918 | A1 | 11/2009 | Falicoff et al. |
| 2010/0008099 | A1 | 1/2010 | Inoue et al. |
| 2010/0102199 | A1 | 4/2010 | Negley et al. |
| 2010/0128463 | A1 | 5/2010 | Kim et al. |
| 2010/0232173 | A1 | 9/2010 | Ohno et al. |
| 2011/0085343 | A1 | 4/2011 | Ohno et al. |
| 2011/0085352 | A1 | 4/2011 | Ito et al. |
| 2011/0198566 | A1 | 8/2011 | Yoshizumi et al. |
| 2011/0215701 | A1 | 9/2011 | Tong et al. |
| 2011/0248624 | A1 | 10/2011 | Kishimoto et al. |
| 2011/0280031 | A1 | 11/2011 | Luger et al. |
| 2012/0026721 | A1 | 2/2012 | Kurt et al. |
| 2012/0068630 | A1 | 3/2012 | Li et al. |
| 2012/0104934 | A1 | 5/2012 | Fukai et al. |
| 2012/0106183 | A1 | 5/2012 | Takahashi |
| 2012/0106188 | A1 | 5/2012 | Takahashi et al. |
| 2012/0106189 | A1 | 5/2012 | Takahashi et al. |
| 2012/0140504 | A1 | 6/2012 | Fukai et al. |
| 2012/0163009 | A1 | 6/2012 | Nakazato et al. |
| 2012/0224384 | A1 | 9/2012 | Takahira et al. |
| 2013/0119862 | A1* | 5/2013 | Ahn .................... B60Q 1/143 315/79 |
| 2014/0112012 | A1 | 4/2014 | Nakazato et al. |

FOREIGN PATENT DOCUMENTS

| | | |
|---|---|---|
| CN | 101629689 | 1/2010 |
| DE | 10 2005 041 234 | 3/2007 |
| DE | 10 2007 008 994 | 9/2007 |
| DE | 10 2009 053 581 | 3/2011 |
| EP | 2 280 215 | 2/2011 |
| JP | 7-282609 | 10/1995 |
| JP | 7-318998 | 12/1995 |
| JP | 2002-87153 | 3/2002 |
| JP | 2003-295319 | 10/2003 |
| JP | 2004-231179 | 8/2004 |
| JP | 2004-241142 | 8/2004 |
| JP | 2004-327361 | 11/2004 |
| JP | 2005-150041 | 6/2005 |
| JP | 2005-205195 | 8/2005 |
| JP | 2006-210887 | 8/2006 |
| JP | 2006-253019 | 9/2006 |
| JP | 2007-30570 | 2/2007 |
| JP | 2007-142173 | 6/2007 |
| JP | 2007-200782 | 8/2007 |
| JP | 2008-13014 | 1/2008 |
| JP | 2008-227042 | 9/2008 |
| JP | 2009-9898 | 1/2009 |
| JP | 2009-48786 | 3/2009 |
| JP | 2009-513003 | 3/2009 |
| JP | 2009-67083 | 4/2009 |
| JP | 2009-96250 | 5/2009 |
| JP | 2009-129683 | 6/2009 |
| JP | 2009-266437 | 11/2009 |
| JP | 2009-302186 | 12/2009 |
| JP | 2010-86815 | 4/2010 |
| JP | 2010-140663 | 6/2010 |
| JP | 2010-153241 | 7/2010 |
| JP | 2010-184625 | 8/2010 |
| JP | 2010-198805 | 9/2010 |
| JP | 2010-212148 | 9/2010 |
| JP | 2010-212615 | 9/2010 |
| JP | 2010-232044 | 10/2010 |
| JP | 2010-277123 | 12/2010 |
| JP | 2011-21062 | 2/2011 |
| JP | 2012-243727 | 12/2012 |
| WO | WO-2007/105647 | 9/2007 |
| WO | WO-2009/145298 | 12/2009 |
| WO | WO-2010/116305 | 10/2010 |

OTHER PUBLICATIONS

Takahashi et al., U.S. Office Action mailed Jun. 11, 2013, directed to U.S. Appl. No. 13/284,487; 13 pages.

Takahashi et al., U.S. Office Action mailed Aug. 8, 2013, directed to U.S. Appl. No. 13/284,523; 17 pages.

Takahashi et al., U.S. Notice of Allowance mailed Nov. 20, 2013, directed to U.S. Appl. No. 13/284,487; 13 pages.

Takahashi et al., U.S. Notice of Allowance mailed Jan. 27, 2014, directed to U.S. Appl. No. 13/284,523; 8 pages.

Fukai et al., U.S. Office Action mailed Feb. 10, 2014, directed to U.S. Appl. No. 13/297,008; 12 pages.

Takahashi, U.S. Notice of Allowance mailed Feb. 21, 2014, directed to U.S. Appl. No. 13/280,572; 10 pages.

Fukai et al., U.S. Office Action mailed May 23, 2014, directed to U.S. Appl. No. 13/297,008; 15 pages.

Takahira et al., U.S. Office Action mailed Jun. 13, 2014, directed to U.S. Appl. No. 13/407,366; 15 pages.

Fukai et al., U.S. Office Action mailed Aug. 7, 2014, directed to U.S. Appl. No. 13/297,008; 16 pages.

Fukai et al., U.S. Advisory Action mailed Nov. 4, 2014, directed to U.S. Appl. No. 13/297,008; 9 pages.

Fukai et al., U.S. Office Action mailed Jan. 14, 2015, directed to U.S. Appl. No. 13/297,008; 20 pages.

Takahira et al., U.S. Office Action mailed Jul. 1, 2014, directed to U.S. Appl. No. 13/533,550; 7 pages.

(56) References Cited

OTHER PUBLICATIONS

Takahira et al., U.S. Notice of Allowance mailed Nov. 4, 2014, directed to U.S. Appl. No. 13/407,366; 7 pages.
Takahira et al., U.S. Office Action mailed Dec. 29, 2014, directed to U.S. Appl. No. 13/533,550; 9 pages.
Fukai et al., U.S. Office Action mailed Apr. 15, 2015, directed to U.S. Appl. No. 13/297,008; 18 pages.
Partial European Search Report dated May 15, 2015, directed to EP Application No. 12004832.7; 5 pages.
U.S. Appl. No. 13/297,008, filed Nov. 15, 2011.
U.S. Appl. No. 14/596,808, filed Jan. 14, 2015.
Fukai et al., Examiner's Answer mailed Oct. 1, 2015, directed to U.S. Appl. No. 13/297,008; 7 pages.

* cited by examiner

LIGHT PROJECTING DEVICE AND VEHICULAR HEADLAMP

CROSS REFERENCE TO RELATED APPLICATIONS

This application is a continuation of U.S. application Ser. No. 13/533,550, filed on Jun. 26, 2012, which claims priority under 35 U.S.C. §119 to Patent Application No. 2011-144821 filed in Japan on Jun. 29, 2011, Patent Application No. 2011-144818 filed in Japan on Jun. 29, 2011, and Patent Application No. 2012-008483 filed in Japan on Jan. 18, 2012, the entire contents of each are hereby incorporated by reference.

FIELD OF THE INVENTION

The present invention relates to a light-projecting device including a plurality of light source units, and more specifically, relates to a light-projecting device capable of forming a desired illuminated region by projecting light in a partitioning manner with each of the light source units.

BACKGROUND OF THE INVENTION

Conventionally, halogen lamps have often been used as headlamps for cars or the like (vehicle headlamp). However, in recent years, headlamps that use HID lamps (High Discharge Lamp) are increasing in its number.

Headlamps are generally configured capable of forming a low beam light distribution pattern (illuminated region), which pattern has a cut-off line on its upper edge. This is to ensure forward visibility for the driver while preventing a driver of an oncoming vehicle from becoming dazzled by the headlamps.

Headlamps which use light emitting diodes (LED) as their light sources have been developed eagerly recently, which LED is low in its electricity consumption. For example, Patent Literature 1 discloses a headlamp that forms an illuminated region 111 by combining patterns 111a to 111c that are obtained by projecting light on different regions with respective light source units (hereinafter, called region partitioning headlamps), as illustrated in FIG. 37.

Moreover, Patent Literature 2 discloses a headlamp that forms an illuminated region 211 by overlapping patterns 211a to 211d of respective light source units in a superposed manner (hereinafter, called superposed headlamp), as illustrated in FIG. 38.

Patent Literature 1

Japanese Patent Application Publication, Tokukai, No. 2007-030570 A (Publication Date: Feb. 8, 2007)

Patent Literature 2

Japanese Patent Application Publication, Tokukai, No. 2008-013014 A (Publication Date: Jan. 24, 2008)

Patent Literature 3

Japanese Patent Application Publication, Tokukai, No. 2004-231179 A (Publication Date: Aug. 19, 2004)

SUMMARY OF THE INVENTION

In order to project the light from the light source to a small spot with use of a reflector, it is preferable that the brightness of the light source is high and that a relative size of the light source with respect to the reflector is sufficiently small.

However, with the halogen lamp, the HID lamp or the LED, not enough brightness is obtained. Furthermore, there are technical limits in reducing the diameter size of the light source, so therefore it is not possible to project light to a small region with use of a reflector having a small diameter.

Hence, in order to project light from the light source to a further smaller spot, it is necessary to use a reflector having a large diameter; with the headlamps which are limited in its disposed space, it was difficult to employ this into practical use.

Accordingly, in the headlamp disclosed in Patent Literature 1, the spot diameter of the light source unit cannot be controlled, and thus is difficult to project light to the illuminated region upon partitioning the illuminated region into smaller regions. Namely, it is necessary to use a reflector of a large diameter to project light to the illuminated region in a partitioning manner of further smaller regions, which as a result causes a problem that the device configuration increases in its size.

Moreover, with the superposed headlamp as in Patent Literature 2, light is projected from a plurality of light sources to the superposed region. This causes a problem that illumination efficiency drops due to the unnecessary generation of luminous flux.

The present invention is accomplished in view of the foregoing problems, and an object thereof is to provide a light-projecting device that is capable of efficiently forming a desirable illuminated region.

Solution to Problem

In order to attain the object, a light-projecting device according to the present invention includes a plurality of light source units each including (i) a light emitting section that emits light upon receiving light and (ii) a light distribution section provided corresponding to the light emitting section, the light distribution section distributing light from the light emitting section to a part of an illuminated region, each of the light source units projecting light from the light emitting section to a corresponding light-projected region, the light-projected region being a partitioned region of the illuminated region, and the illuminated region being formed by combining a plurality of the light-projected region to which light is projected from a corresponding one of the light source units.

In the foregoing configuration, a light source unit includes a light emitting section that emits light upon receiving light. Hence, it is possible to reduce size of the light emitting section, thereby making it possible to have the light emitting section be of a relatively smaller size with respect to that of the light distribution section. This thus allows for achieving high light distribution characteristics even with use of a light distribution section of a small diameter. Accordingly, each of the light source units can project light received from the light emitting section to a smaller region and can reduce the size of the device configuration.

The light-projecting device according to the present invention includes a plurality of such light source units, and each of the light source units projects light from the light emitting section to light-projected regions which are partitioned regions of an illuminated region. Namely, each of the light source units projects light to the illuminated region in a partitioning manner.

Hence, by combining a plurality of small light-projected regions per light source unit, it is possible to form a desired illuminated region.

Moreover, in the foregoing configuration, the light source units project light to different light-projected regions every unit. Hence, no unnecessary luminous flux is generated, thereby enabling efficient illumination.

As a result, according to the present invention, it is possible to accomplish a light-projecting device that allows for efficiently forming a desired illuminated region.

As described above, the light-projecting device according to the present invention includes a plurality of light source units each including (i) a light emitting section that emits light upon receiving light and (ii) a light distribution section provided corresponding to the light emitting section, the light distribution section distributing light from the light emitting section to a part of an illuminated region, each of the light source units projecting light from the light emitting section to a corresponding light-projected region, the light-projected region being a partitioned region of the illuminated region, and the illuminated region being formed by combining a plurality of the light-projected region to which light is projected from a corresponding one of the light source units.

Hence, according to the present invention, an effect is brought about that it is possible to accomplish a light-projecting device that is capable of efficiently forming a desired illuminated region.

DETAILED DESCRIPTION OF THE INVENTION

Described below is a first embodiment of a light-projecting device according to the present invention, with reference to FIG. 1 through FIG. 6B. The present embodiment exemplifies a case in which the light-projecting device according to the present invention is employed to a high beam headlamp (driving headlamp) for a car (vehicle).

Note however that the light-projecting device according to the present invention may be accomplished as the low beam headlamp (passing headlamp) or as a vehicle headlamp other than for a car. Furthermore, the light-projecting device according to the present invention may be accomplished as another light-projecting device such as a headlamp for a moving object other than a vehicle (e.g. human being, ship, airplane, submarine, rocket), or may be accomplished as a searchlight, projector, or an indoor illumination device (downlight, standlamp etc.).

Figure 1:
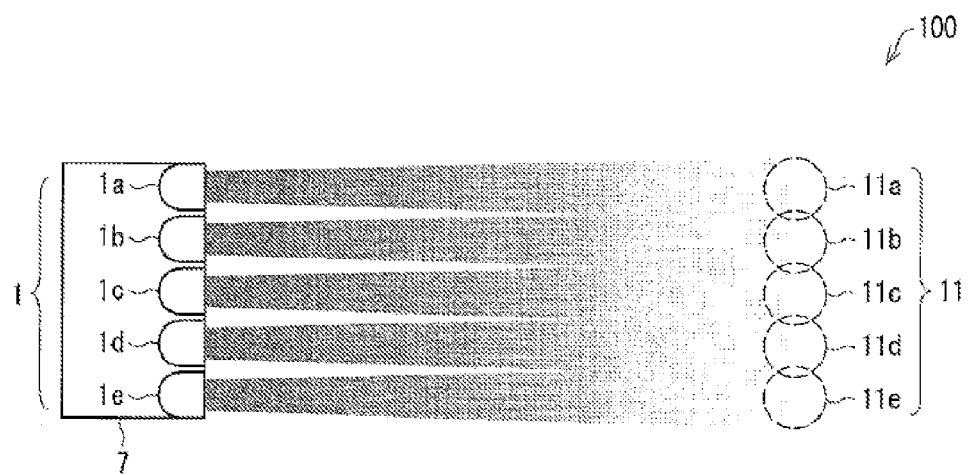
FIG. 1 is a plan view schematically illustrating a configuration of a light-projecting device according to Embodiment 1.
Figure 2:
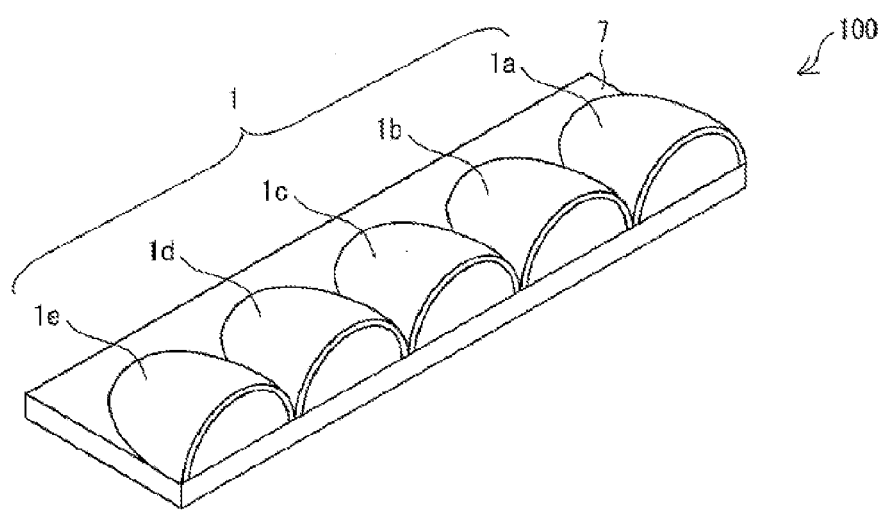
FIG. 2 is a perspective view of the light-projecting device illustrated in FIG. 1.
Figure 3:
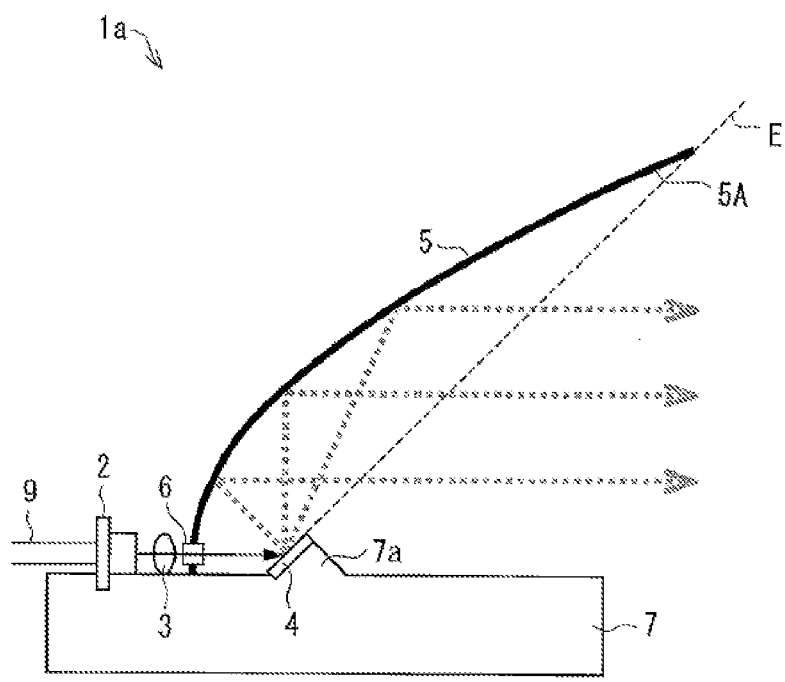
FIG. 3 is a cross sectional view schematically illustrating a configuration of a light source unit included in the light-projecting device illustrated in FIG. 2.

First described is the configuration of a light-projecting device 100 according to the present embodiment, with reference to FIG. 1 to FIG. 3.

FIG. 1 is a plan view schematically illustrating the configuration of the light-projecting device 100 according to the present embodiment, and FIG. 2 is a perspective view illustrating the light-projecting device 100 illustrated in FIG. 1. As illustrated in FIG. 1 and FIG. 2, the light-projecting device 100 includes a light source unit 1. In the present embodiment, the light source unit 1 includes five light source units 1a to 1e, and the light source units 1a to 1e are aligned in one line in a horizontal direction, on a metal base 7. The light source unit 1 is provided one each on either front edges of the car in which the light source unit 1 is provided (hereinafter, called loaded vehicle).

The light-projecting device 100 forms a desired illuminated region 11 by combining a plurality of light-projected spots (light-projected regions) 11a to 11e that are projected with light by the light source units 1a to 1e, respectively.

The following description explains configurations of the light source unit 1 and the metal base 7. As to the light source unit 1, since the light source units 1a to 1e are substantially identical in configuration, description for just the light source unit 1a is provided.

FIG. 3 is a cross sectional view schematically illustrating a configuration of the light source unit 1a provided in the light-projecting device 100 illustrated in FIG. 2. As illustrated in FIG. 3, the light source unit 1a includes a laser element 2, a converging lens 3, a light emitting section 4, and a reflector (light distribution section) 5.

The laser element 2 is a light emitting element functioning as an excitation light source that emits light (excitation light, laser beam). The laser element 2 is disposed outside the reflector 5; this laser element 2 may be one which includes one light emitting point per chip, or may include a plurality of light emitting points per chip.

By using a laser beam as the excitation light, it is possible to control an emitted range with respect to the light emitting section 4 in a narrow manner. This hence allows for reducing the size of the light emitting section 4. Therefore, light emitted from the light emitting section 4 is controlled in its optical path by the reflector 5, to efficiently project light. This allows for accomplishing a highly bright light source unit 1a that is improved in light distribution characteristics.

Instead of the laser element 2, it is also possible to use LED (light emitting diode). However, it is preferable to use the laser element 2 that has a higher brightness than the LED, since it is possible to achieve a higher brightness of the light emitting section 4.

Just one laser element 2 may be used as described in the present embodiment. However, in order to achieve a laser beam having a high output, it is easier to use a plural number of laser elements 2. In a case in which a plurality of laser elements 2 are provided, a laser beam is emitted from each of the plurality of laser elements 2, as excitation light. In this case, laser beams of different wavelengths may be emitted from the laser elements 2 so that a plurality of kinds of lasers are combined; for example, a blue laser may be combined with a green laser, or a violet laser may be combined with a blue laser.

Moreover, in a case in which the quantities of light of the light source units 1a to 1e are not individually controlled as in the present embodiment, the light source units 1a to 1e may share a common laser element 2. In this case, the laser beam emitted from the common laser element 2 is split up, to be distributed to each of the light source units 1a to 1e.

The laser beam of the laser element 2 has a wavelength of, for example, 405 nm (violet) or 450 nm (blue). It is not limited to these however, and is selected as appropriate depending on the kind of fluorescent material contained in the light emitting section 4.

In the present embodiment, the laser element 2 is mounted on a metal packaging having a diameter of 9 mm, and emits a laser beam having a wavelength of 405 nm (violet) and with an output of 1 W. The laser element 2 is connected to a wiring 9, and through this wiring 9, electric power and the like are supplied to the laser element 2.

The converging lens 3 is for adjusting a light emitted range so that the laser beam emitted from the laser element 2 is appropriately emitted to the light emitting section 4. The converging lens 3 causes the laser beam to be emitted to the light emitting section 4 via a window section 6 provided in the reflector 5.

In the present embodiment, the converging lens 3 converges the laser beams emitted from the laser element 2 so that the emitted range of the laser beams on the light emitting section 4 is of a diameter of 0.3 mm.

In the present embodiment, the converging lens 3 is made up of one lens, however the converging lens 3 can be made up by a plurality of lenses.

The light emitting section 4 emits fluorescence upon receiving the laser beam emitted from the laser element 2, and includes fluorescent material (fluorescent substance) that absorbs the laser beam and emits fluorescence. More specifically, the light emitting section 4 is a member in which fluorescent material is dispersed inside sealing material, or is solidified fluorescent material. According to such a light emitting section 4, it is possible to form the light emitting section 4 in a size smaller than the LED or the like.

The light emitting section 4 is disposed on the metal base 7 and at a substantially focal position of the reflector 5. Hence, the fluorescence emitted from the light emitting section 4 has its optical path be controlled by the fluorescence being reflected on a reflective curve plane of the reflector 5. The plane to which the laser beam of the light emitting section 4 is emitted (hereinafter, called irradiated plane) may have a reflection preventing structure that prevents the reflection of the laser beam. This thus allows for preventing the reflection of the laser beam on the irradiated plane of the light emitting section 4, thereby making it possible to guide more laser beams inside the light emitting section 4 and convert those to fluorescence.

Note that by disposing the light emitting section 4 in a position shifted from the focal position of the reflector 5, it is possible to intentionally control a light-projected range (spot diameter) of the light source unit 1a.

Moreover, the light emitting section 4 is disposed inclined on a slope section 7a provided on the metal base 7 so that an extended plane E of the irradiated plane comes into contact with an edge of an opening 5A of the reflector 5. This allows for the fluorescence emitted from the light emitting section 4 to be efficiently distributed upon reflection on the reflector 5, without the fluorescence directly leaking outside.

Furthermore, by providing the slope section 7a, it is not possible to directly see the light emitting point of the light emitting section 4 from the outside. This hence allows for preventing the occurrence of dazzling caused by just having one point be bright when seeing the light source unit 1a from the outside.

Examples of the fluorescent material of the light emitting section 4 encompass oxynitride fluorescent material (e.g. SiAlON fluorescent material) or III-V compound semiconductor nanoparticle fluorescent material (e.g. indium phosphide: InP). These fluorescent materials each have high heat tolerance against a high-output (and/or a high light density) laser beam emitted from the laser element 2, and are optimum as a laser illumination light source. Note that the fluorescent material of the light emitting section 4 is not limited to those described above, and other fluorescent materials may be employed.

Moreover, it is stipulated by law that the illumination light of the light-projecting device 100 for cars must be white with a predetermined range of chromaticity. Hence, the light emitting section 4 includes fluorescent material selected so that the illumination light is to be made white.

For example, when blue, green, and red fluorescent material are included in the light emitting section 4 and the light emitting section is irradiated with a laser beam of 405 nm, a white light is generated. Moreover, when yellow fluorescent material (or green and red fluorescent material) is included in the light emitting section 4 and this light emitting section 4 is irradiated with a laser beam of 450 nm (blue) (or alternatively, a laser beam of a so-called bluish color, having a peak wavelength in a wavelength range of not less than 440 nm but not more than 490 nm), a white light is obtained.

The sealing material of the light emitting section 4 is, for example, glass material (inorganic glass, organic inorganic hybrid glass), or resin material such as silicone resin. As glass material, low melting glass may also be used. It is preferable that the sealing material has a high transparency, and is preferable in a case in which the laser beam is of a high output that the sealing material has a high heat tolerance.

In the present embodiment, the light emitting section 4 includes RGB fluorescent material constituted of three types of fluorescent material: red fluorescent material ($CaAlSiN_3$:Eu), green fluorescent material ($\beta$-SiAlON:Eu), and blue fluorescent material (($BaSr)MgAl_{10}O_{17}$:Eu), so that white fluorescence is emitted upon irradiation with a laser beam having a wavelength of 405 nm from the laser element 2. Moreover, the light emitting section 4 is shaped of a square whose one side is a length of 1 mm, and has a mixture of fluorescent material powder and resin applied on the slope section 7a so that a thin film having a thickness of 0.1 mm is formed thereon. By having such a light emitting section 4, it is possible to achieve a fluorescence of 80 lumen from each of the light emitting sections 4, in the present embodiment. Moreover, the light emitting section 4 can be formed as a point light source that has a high brightness of 320 $cd/mm^2$.

When the light-projecting device 100 is to be used as an illumination device other than a vehicle headlamp, the color of the light emitted from the light emitting section 4 is not limited to white, and may be a light emitting color other than white, such as blue or red.

Moreover, a scattering section that reflects the laser beam diffusely may be disposed in the vicinity of the focus of the reflector 5, as the light emitting section 4. By using the scattering section as the light emitting section 4, it is possible to use the laser beam emitted from the laser element 2 as illumination light. Namely, by distributing the laser beam scattered by the scattering section with use of the reflector 5, it is possible to use the laser beam as illumination light. In this case, in order to output white light, a plurality of laser elements 2 which emit, to one reflector 5, laser beams of different wavelengths, can be used in combination.

The reflector 5 reflects the fluorescence emitted from the light emitting section 4 and distributes light to a part of the illuminated region 11. The reflector 5 may be, for example, a member whose surface has a metal thin film formed thereon, or may be a member made of metal.

The reflector 5 includes, in its reflection surface, at least a part of a partial curved surface obtained by cross sectioning a curved surface (parabolic curved surface) formed by rotating a parabola about a symmetry axis of the parabola, which symmetry axis serves as its rotational axis and which curved surface is cross sectioned at a flat plane parallel to the rotational axis. Moreover, the reflector 5 has a semicircular opening 5A in a direction in which the fluorescence emitted from the light emitting section 4 is distributed.

The light from the light emitting section 4 that is disposed on a position substantially focal of the reflector 5 forms a pencil of rays nearly parallel, by the reflector 5 that has the reflection surface of the parabolic curved surface, and the light is distributed in a forward direction of the opening 5A.

This allows for efficiently distributing light from the light emitting section 4 within a narrow solid angle, thereby being able to improve use efficiency of the light.

Moreover, the laser element 2 is disposed outside the reflector 5, and the reflector 5 has a window section 6 that allows transmission or passing through of the laser beam. The window section 6 may be a through-hole, or may include a transparent member through which the laser beam can be transmitted. For example, a transparent plate capable of transmitting through a laser beam however provided with a filter that reflects white light (fluorescence of light emitting section 4) may be provided as the window section 6. With this configuration, it is possible to prevent the fluorescence emitted from the light emitting section 4 from leaking from the window section 6.

The present embodiment uses a semicircular reflector 5 whose inner plane of a half parabola mirror made of resin is coated with aluminum, and is sized to have a depth of 8.3 mm and a radius 10 mm in its opening 5A.

The reflector 5 may be a parabola mirror having an opening of a closed circular shape, or a member including a part thereof. Moreover, it is also possible to use, other than the parabola mirror, one of an oval shape or a freely curved shape, or alternatively, a multifacet (multireflector). Furthermore, the reflector 5 may partially include a part that is not a parabolic curved surface.

Moreover, although not illustrated, the light source unit 1a may include a lens that controls the distribution of light, at the opening 5A of the reflector 5.

With such a configuration, it is possible to accomplish the light source units 1a to 1e including a small light emitting section 4 having a high brightness, and thus improve the light distribution characteristics of the light source units 1a to 1e.

The metal base 7 is a supporting member for supporting the light source units 1a to 1e, and is made of metal (e.g. aluminum, copper, or iron). Hence, the metal base 7 has high heat conductivity; heat generated by the laser element 2 and the light emitting section 4 provided on the metal base 7 is released efficiently.

The member supporting the light emitting section 4 is not limited to that made of metal, and may include substances which have high thermal conductivity other than metal (glass, sapphire, high thermoconductive ceramics etc.). However, it is preferable that the surface of the slope section 7a on which the light emitting section 4 is applied serve as a reflection surface. By having the surface of the slope section 7a be the reflection surface, it is possible to have the laser beam entered from the irradiated plane of the light emitting section 4 to be converted into fluorescence and then be reflected on the reflection surface to travel towards the reflector 5. Moreover, it is possible to have the laser beam entered from the irradiated plane of the light emitting section 4 be reflected on the reflection surface so as to again travel inside the light emitting section 4 to convert the laser beam into fluorescence.

Figure 4:
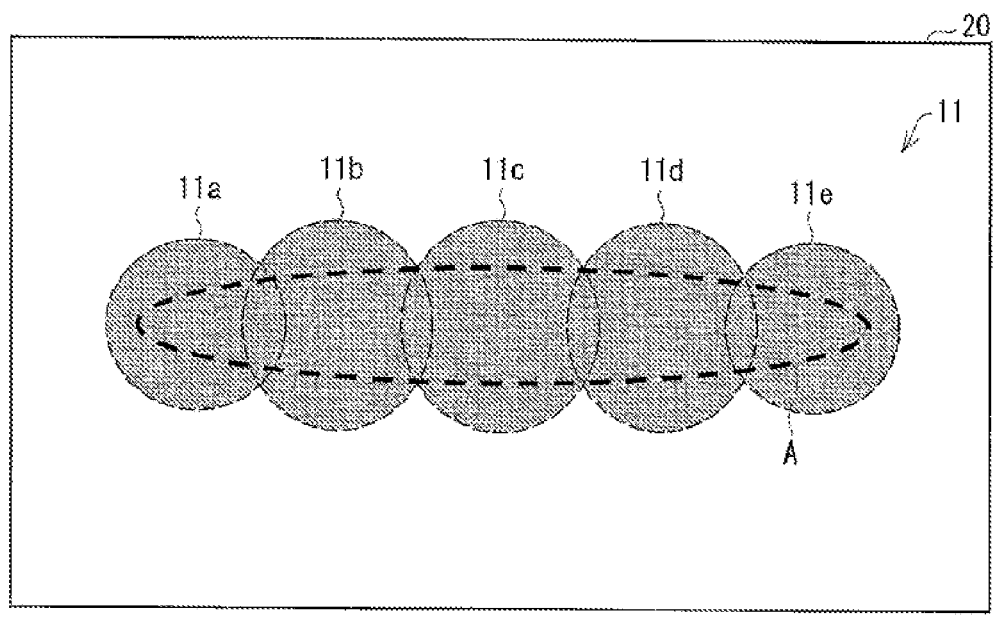
FIG. 4 is a schematic view illustrating an illuminated region in which light is projected on a master flat plane by the light-projecting device illustrated in FIG. 1.

Next described are light distribution characteristics of the light-projecting device 100, with reference to FIG. 4. With vehicle headlamps, light distribution characteristics standards are set, which are indicative of, for example, illumination intensity, optical axis direction, and/or distribution of light. The light distribution characteristics standards differ between countries, so therefore it is necessary to form an illuminated region that can accommodate to various light distribution characteristics standards.

FIG. 4 is a schematic view illustrating an illuminated region 11 in which light is projected on a master flat plane 20 by the light-projecting device 100. The master flat plane 20 is a flat plane disposed perpendicularly at a position approximately 25 m away in a traveling direction of the loaded vehicle.

As illustrated in FIG. 4, in a case in which the light-projecting device 100 is to illuminate a set region A (e.g., corresponding to a high beam light distribution characteristics standard) on the master flat plane 20, the five light source units 1a to 1e project light to the set region A in a partitioning manner. More specifically, the light-projecting device 100 forms the illuminated region 11 corresponding to the set region A by projecting light to different regions of the set region A with the light source units 1a to 1e, and by combining these light-projected spots 11a to 11e.

As such, the light-projecting device 100 is a region partitioning headlamp that projects light to the illuminated region 11 with the light source units 1a to 1e in a partitioning manner, which each of the light source units 1a to 1e includes a light emitting section 4 that emits fluorescence upon receiving a laser beam, as described above. This allows for making the size of the light emitting section 4 relatively small with respect to the reflector 5, thereby allowing for achieving high light distribution characteristics even with use of a reflector 5 having a small diameter. Furthermore, each of the light source units 1a to 1e can project the light from the light emitting section 4 to the small light-projected spots 11a to 11e, and thus can reduce the size of the light-projecting device 100.

The light-projecting device 100 according to the present embodiment includes such light source units 1a to 1e. Hence, it is possible to form a desired illuminated region 11 by combining a plurality of the small light-projected spots 11a to 11e projected by the light source units 1a to 1e, respectively.

Moreover, in the light-projecting device 100, the light source units 1a to 1e project light to the small light-projected spots 11a to 11e, respectively, to form the illuminated region 11. Accordingly, no unnecessary pencil of rays is generated, thereby allowing for efficient illumination.

Furthermore, by controlling the quantity of light for each of the light source units 1a to 1e, it is possible to easily carry out partial light quantity adjustment of the illuminated region 11. For example, in a case in which the vicinity of a center of the set region A is to be more brightly illuminated, the quantity of light to the light-projected spots 11b to 11d is increased by for example increasing individual outputs of the light source units 1b to 1d that project light to the vicinity of the center of the set region A. As a result, it is easily possible to carry out light quantity adjustment, such as more brightly illuminating the vicinity of the center of the set region A. The processes of controlling the quantity of light for each of the light source units 1a to 1e is described in detail in Embodiment 2 described later.

As described above, the light-projecting device 100 according to the present embodiment includes light source units 1a to 1e, each of which includes (i) a light emitting section 4 that emits light upon receiving a laser beam and (ii) a reflector 5 provided corresponding to the light emitting section 4 and which distributes light from the light emitting section 4 to a part of the illuminated region 11, each of the light source units 1a to 1e projecting the light from the light emitting section 4 to a corresponding one of the light-projected spots 11a to 11e, which light-projected spots 11a to 11e are partitioned regions of the illuminated region 11, and the illuminated region 11 being formed by combining a plurality of the light-projected spots 11a to 11e that are projected with light by its respective light source units 1a to 1e.

In the light-projecting device 100, the light source units 1a to 1e each independently has a light emitting section 4 that emits light upon receiving a laser beam. Hence, it is possible to reduce the size of the light emitting section 4 so as to be relatively smaller with respect to the reflector 5. This allows for obtaining high light distribution characteristics even if a reflector 5 of a small diameter is used. Consequently, the light source units 1a to 1e can project light from the light emitting section 4 to the small light-projected spots 11a to 11e, while reducing the size of the light-projecting device 100.

The light-projecting device 100 according to the present embodiment includes such light source units 1a to 1e, and each of the light source units 1a to 1e project light from the light emitting section 4 to the light-projected spots 11a to 11e, which light-projected spots are partitioned regions of the illuminated region 11. Namely, the light source units 1a to 1e project light to the illuminated region 11 in a partitioning manner.

Hence, by combining a plurality of the small light-projected spots 11a to 11e that are projected with light by the light source units 1a to 1e, respectively, it is possible form a desired illuminated region 11.

Moreover, in the light-projecting device 100, each of the light source units 1a to 1e project light to different light-projected spots 11a to 11e. This prevents the generation of unnecessary pencil of rays, thereby allowing for efficient illumination.

Hence, according to the present embodiment, it is possible to achieve a light-projecting device 100 that efficiently forms the desired illuminated region.

Next described is a modification of the light-projecting device 100 according to the present embodiment, with reference to FIG. 5A to FIG. 6B.

Figure 5A:
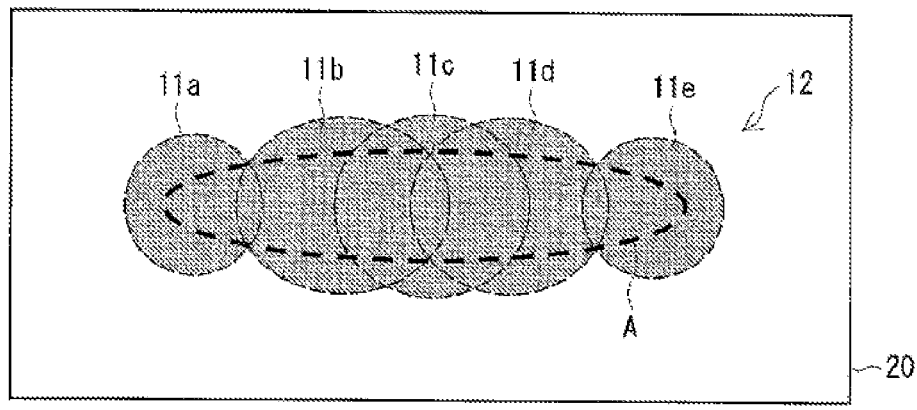
FIG. 5A is a schematic view illustrating a modification of an illuminated region in which light is projected on a master flat plane by the light-projecting device illustrated in FIG. 1.
Figure 5B:
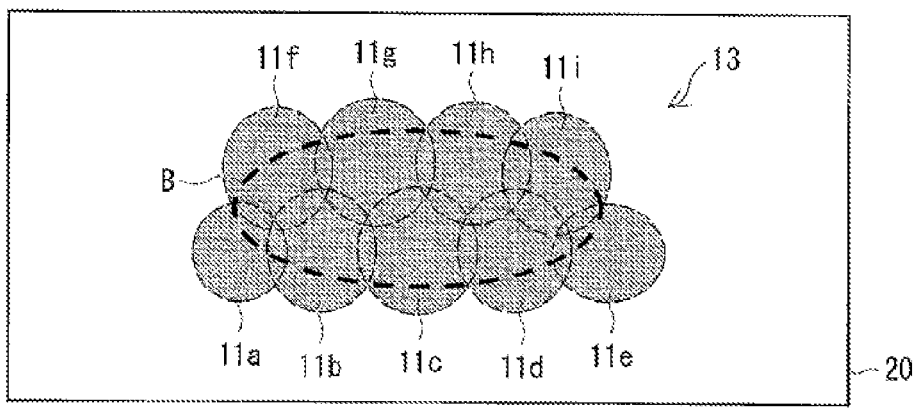
FIG. 5B is a schematic view illustrating a modification of an illuminated region in which light is projected on a master flat plane by the light-projecting device illustrated in FIG. 1.
Figure 5C:
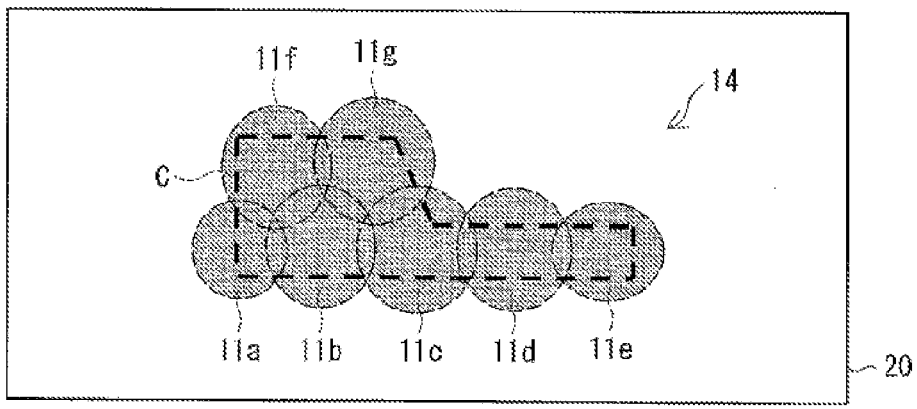
FIG. 5C is a schematic view illustrating a modification of an illuminated region in which light is projected on a master flat plane by the light-projecting device illustrated in FIG. 1.

FIG. 5A to FIG. 5C are schematic views each illustrating a modification of the illuminated region 11 that is projected with light by the light-projecting device 100 on the master flat plane 20.

As illustrated in FIG. 5A, for example an illuminated region 12 may be formed in a case in which the set region A is to be illuminated more brighter around the center, in which the illuminated region 12 has the light-projected spots 11b to 11d that are positioned around the center of the set region A be positioned with a narrow pitch.

As such, according to the light-projecting device 100, the light source units 1a to 1e project light to different light-projected spots 11a to 11e, every unit. Hence, by changing the positions of the light-projected spots 11a to 11e, it is possible to easily form the illuminated region 12 in which the quantity of light is controlled partially.

Moreover, an illuminated region 13 corresponding to a set region B may be formed as illustrated in FIG. 5B, by combining light-projected spots 11a to 11i. In this case, the illuminated region 13 is partitioned into nine regions in a sideways direction and a vertical direction, and light source units (omitted in illustration) project light to their corresponding light-projected spots 11a to 11i. As such, it is possible to form a desired illuminated region 13 by projecting light in a partitioning manner in a sideways direction and a vertical direction, with use of the light-projected spots 11a to 11i.

Furthermore, an illuminated region 14 corresponding to a set region C equivalent to a low beam light distribution characteristics standard may be formed by combining the light-projected spots 11a to 11g (see FIG. 5C). In this case, it is possible to form the illuminated region 14 corresponding to the low beam light distribution characteristics standard by disposing the light-projected spots 11a to 11e to be aligned in one row and disposing the light-projected spots 11f and 11g above the light-projected spots 11a to 11e to form a cut offline on an upper edge of the illumination region 14.

As such, by combining, as appropriate, the light-projected spots 11a to 11i and the like that project light to the illuminated region in a partitioning manner in the sideways and vertical directions, it is possible to form an illuminated region of any shape.

Figure 6A:
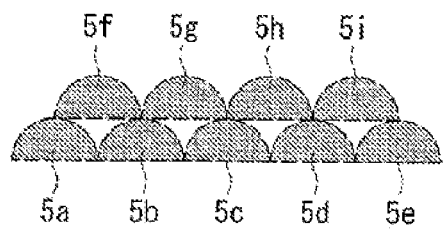
FIG. 6A is a front view illustrating an example of a disposition of a reflector provided in the light-projecting device illustrated in FIG. 1.
Figure 6B:
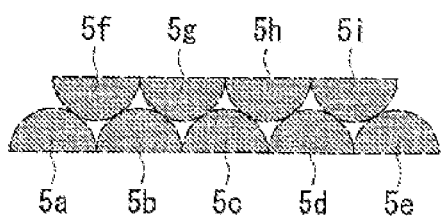
FIG. 6B is a front view illustrating another example of a disposition of a reflector included in the light-projecting device illustrated in FIG. 1.

FIG. 6A and FIG. 6B are front views illustrating a disposition example of a reflector 5 provided in the light-projecting device 100.

In a case in which the reflectors 5a to 5i are to be disposed as illustrated in FIG. 6A, the reflectors 5a to 5e may first be aligned in one line, and the reflectors 5f to 5i may be disposed on the reflectors 5a to 5e, to form a zigzag disposition. This forms the illuminated region 13 that corresponds to the set region B illustrated in FIG. 5B.

Moreover, as illustrated in FIG. 6B, when the reflectors 5f to 5i are disposed in the zigzag manner on the reflectors 5a to 5e, it is preferable that the reflectors 5a to 5e and the reflectors 5f to 5i are disposed so that their circumferential parts are to be in contact with each other. This reduces the volume of the reflectors 5a to 5i that occupy the light-projecting device 100, thereby enabling to reduce the size of the light-projecting device 100.

Described below is a second embodiment of the light-projecting device according to the present invention, with reference to FIG. 7 to FIG. 12. The present embodiment describes a light-projecting device 120 that controls the quantity of light for every light source unit.

Members identical to the embodiments above are provided with identical reference signs, and their descriptions have been omitted.

Figure 7:
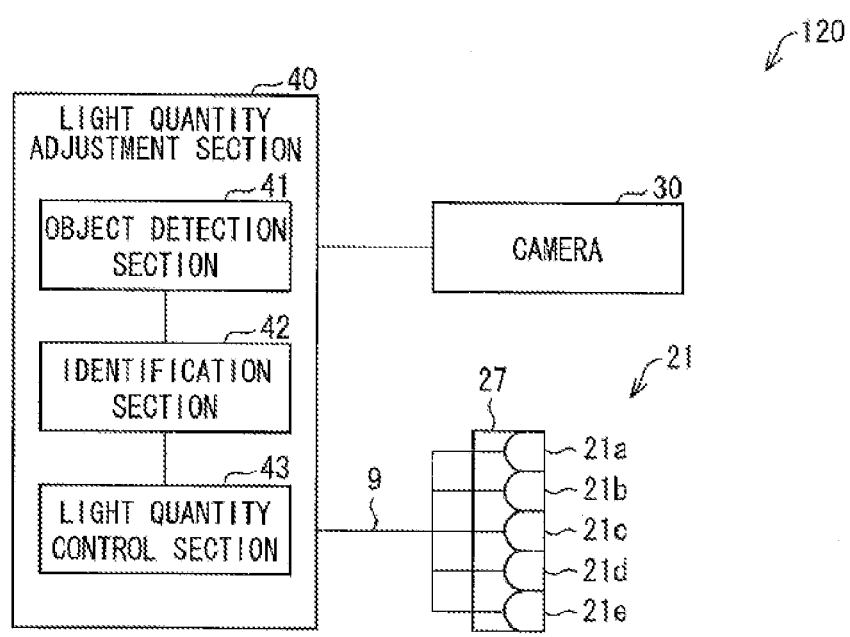
FIG. 7 is a block diagram schematically illustrating a configuration of a light-projecting device according to Embodiment 2.
Figure 8:
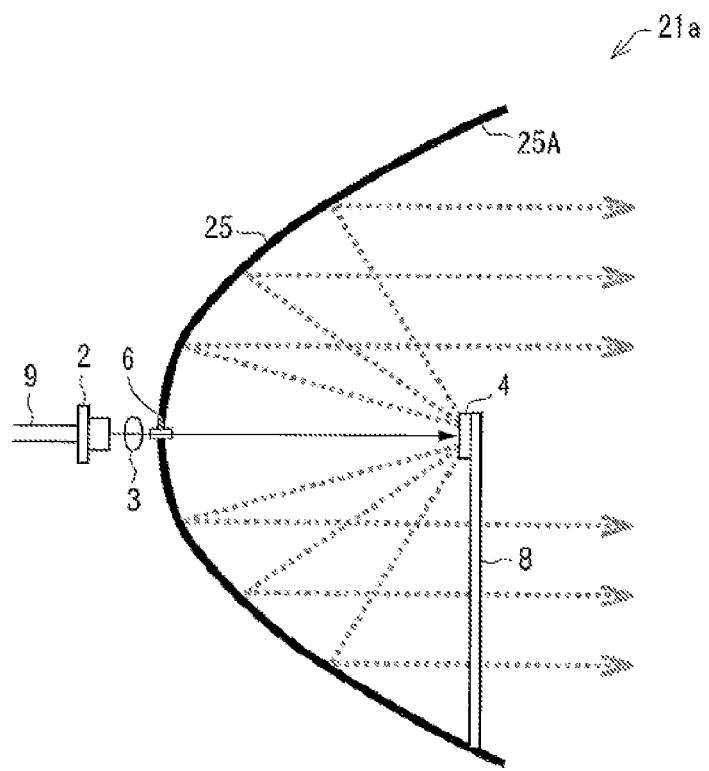
FIG. 8 is a cross sectional view schematically illustrating a configuration of a light source unit included in the light-projecting device illustrated in FIG. 7.

First described is a configuration of the light-projecting device 120 according to the present embodiment, with reference to FIG. 7 and FIG. 8.

FIG. 7 is a block diagram schematically illustrating a configuration of the light-projecting device 120 according to the present embodiment. As illustrated in FIG. 7, the light-projecting device 120 includes a light source unit 21, a camera 30, and a light quantity adjustment section 40. In the present embodiment, the light source unit 21 is made up of five light source units 21a to 21e, and the light source units 21a to 21e are aligned in one row in a horizontal direction and are cased inside a chassis 27.

The following description deals with the configuration of the light source unit 21, the chassis 27, the camera 30, and the light quantity adjustment section 40; as to the light source unit 21, since the light source units 21a to 21e have substantially identical configurations, description of just the light source unit 21a is provided.

FIG. 8 is a cross sectional view schematically illustrating a light source unit 21a provided in the light-projecting device 120 illustrated in FIG. 7. As illustrated in FIG. 8, the light source unit 21a includes a laser element (light radiating section) 2, a converging lens 3, a light emitting section 4, and a reflector (light distribution section) 25.

In the present embodiment, the laser element 2 is mounted on a metal package having a diameter of 9 mm, and is adjusted so as to emit a laser beam having a wavelength of 405 nm (violet) with an output of 2 W.

The converging lens 3 converges the laser beam emitted from the laser element 2 so that the irradiated range by the laser beam on the light emitting section 4 is made to be a diameter of 0.6 mm. In the present embodiment, the converging lens 3 converts the laser beams to the light emitting section 4 via a window section 6 provided on a vertex part of the reflector 25.

The light emitting section 4 is fixed on one end of a pillar 8 made of metal, and is disposed mostly at a focal position of the reflector 25 whose cross section is of a parabola shape. The light emitting section 4 is formed by applying, to the pillar 8 that serves as a base, a mixture in which fluorescent material powder is mixed into sealing resin. The other end of the pillar 8 penetrates through the reflector 25, and is connected to a heat releasing member (illustration omitted) that has high thermal conductivity. Hence, heat generated on the light emitting section 4 caused by irradiation of a laser beam propagates to the heat releasing member through the pillar 8, thereby allowing for efficiently releasing heat.

The pillar 8 is not limited to metal, and any material that has good thermal conductivity may be used, for example sapphire or the like. Moreover, use of a transparent material for the pillar 8 allows for effectively using the light controlled by the reflector 25, without shielding the light.

In the present embodiment, the light emitting section 4 includes a RGB fluorescent material of three types of fluorescent material: a red fluorescent material ($CaAlSiN_3$:Eu), a green fluorescent material ($\beta$-SiAlON:Eu), and a blue fluorescent material (($BaSr)MgAl_{10}O_{17}$:Eu), to emit white fluorescence upon receiving a laser beam received from the laser element 2, which laser beam has a wavelength of 405 nm. Moreover, the light emitting section 4 is applied on the pillar 8 so as to form a circular shaped thin film having a thickness of 0.1 mm and a diameter of 1 mm.

By including such a light emitting section 4, the present embodiment can obtain a fluorescence of 200 lumen from the light emitting section 4. Moreover, the light emitting section 4 can be functioned as a point light source having a high brightness of 200 $cd/mm^2$.

The reflector 25 includes at least a part of a curved surface (parabolic curved surface) obtained by rotating a parabola about its symmetry axis that serves as a rotational axis, and has a circular shaped opening 25A in a direction in which fluorescence emitted from the light emitting section 4 is reflected.

Here, the light emitting section 4 is disposed so as to face inside the reflector 25 from the opening 25A (facing a side of a vertex of the reflection surface on the reflector 25), so therefore the light emitted from the light emitting section 4 is always reflected on the reflector 25 and thereafter projected outside from the opening 25A. Thus, since it is not possible to see the light emitting point on the light emitting section 4 directly from the outside, it is possible to prevent the occurrence of dazzling caused by having just one point (light emitting point) be bright. Moreover, even when the laser beam serves as the excitation light, it is possible to provide a configuration with high safety, by use of the present configuration.

The present embodiment uses a circular reflector 25 on which aluminium is coated on an inner surface of a parabola mirror made of resin, and a depth thereof is 8.0 mm and the opening 25A has a radius of 15 mm.

According to such light source units 21a to 21e, it is possible to achieve a light emitting section 4 that has high brightness while being small in size. As a result, it is possible to improve the light distribution characteristics of the light source units 21a to 21e.

Although not illustrated, the light source unit 21a may include a lens at the opening 25A of the reflector 25, for correcting a distribution of the light beams.

The chassis 27 is a housing which houses the light source units 21a to 21e in its inside. The laser element 2 provided in each of the light source units 21a to 21e housed inside the chassis 27 are connected to the light quantity adjustment section 40 via the wiring 9, and its quantity of light is controlled individually.

The camera 30 includes an illuminated region 31 (see FIG. 10A and FIG. 10B), and consecutively captures surrounding images in the forward direction of the loaded vehicle. The camera 30 is disposed, for example, in the vicinity of the room mirror at a front part of the car. An image capturing device for capturing a moving image at a television frame rate may be used as the camera 30.

The camera 30 starts to capture the surrounding images in the front direction of the loaded vehicle from a point in which the light source units 21a to 21e are lighted on, and outputs the captured moving image to the light quantity adjustment section 40.

The light quantity adjustment section 40 controls the quantity of light of the light source units 21a to 21e based on the moving image captured by the camera 30. The light quantity adjustment section 40 includes an object detection section 41, an identification section 42, and a light quantity control section 43.

The object detection section 41 analyzes the moving image captured by the camera 30 and detects an object within light-projected spots 31a to 31e. More specifically, the object detection section 41, upon obtaining the moving image from the camera 30, detects an object for every detection region, which detection region is a region in the moving image that corresponds to a respective one of the light-projected spots 31a to 31e and whose coordinate information is set in advance.

When an object is detected in the detection region, the object detection section 41 outputs a detection signal that is indicative of the detection region from which the object is detected, to the identification section 42.

The identification section 42 identifies a kind of the object in the detection region, which object is indicated by the detection signal outputted from the object detection section 41. More specifically, when the detection signal is obtained from the object detection section 41, the identification section 42 extracts features such as a moving velocity, shape, position and the like of the object within the detection region indicated by the detection signal, and finds a feature value that is a numerical value of the features.

The identification section 42 refers to a reference value table stored in a memory (not illustrated), which reference value table manages reference values that are the features made into numerical values for every kind of object, and thereafter retrieves a reference value whose difference with the found feature value is within a predetermined threshold. For example, the reference value table manages reference values that correspond to an oncoming vehicle, a leading vehicle, a traffic sign, an expectable obstacle or the like. When a reference value that has a difference with the found feature value within the threshold value is identified, the identification section 42 determines the object indicated by the reference value as the object detected by the object detection section 41.

The identification section 42, based on the determination result, outputs an identification signal that is indicative of the kind of object indicated by the reference value and a detection region in which the object is detected, to the light quantity control section 43.

The light quantity control section 43 individually controls, in response to the kind of object indicated by the identification signal outputted from the identification section 42, a quantity of light of the light source units 21a to 21e that project light to the light-projected spots 31a to 31e corresponding to the detection region in which the object is detected. For example, the light quantity control section 43 individually controls the quantity of light of the light source units 21a to 21e by increasing or decreasing an electric current to be supplied to the laser element 2 provided in the light source units 21a to 21e.

More specifically, when the kind of object indicated by the identification signal that is outputted from the identification section 42 is the oncoming vehicle, the leading vehicle or the like, the light quantity control section 43 causes the output of the light source units 21a to 21e that project light to the light-projected spots 31a to 31e corresponding to the detection region in which the oncoming vehicle, the leading vehicle or the like is detected, to be reduced individually.

On the other hand, when the kind of the object indicated by the identification signal that is outputted from the identification section 42 is the traffic sign, the obstacle or the like, the light quantity control section 43 causes the output of the light source units 21a to 21e that project light to the light-projected spots 31a to 31e corresponding to the detection region in which the traffic sign or obstacle is detected, to increase individually.

Note that, by having the output of the light source units 21a to 21e be zero, the lighting of the light source units 21a to 21e is turned off. Hence, the light quantity control section 43 is capable of individually switching between lighting on and off of the light source units 21a to 21e, by controlling the output of the light source units 21a to 21e.

Figure 9:
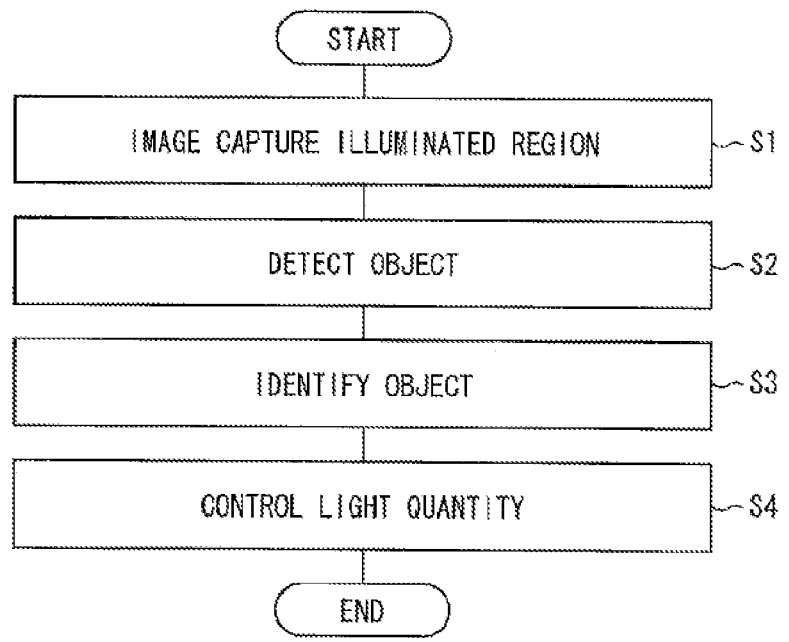
FIG. 9 is a flow chart illustrating a series of processes carried out to individually control quantities of light of the light source unit included in the light-projecting device illustrated in FIG. 7.
Figure 10A:
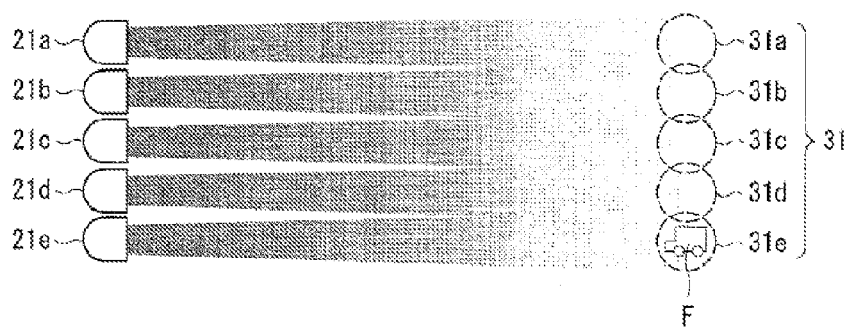
FIG. 10A is a schematic view illustrating an operational state of a light source unit that is controlled in its quantity of light by the processes illustrated in FIG. 9.
Figure 10B:
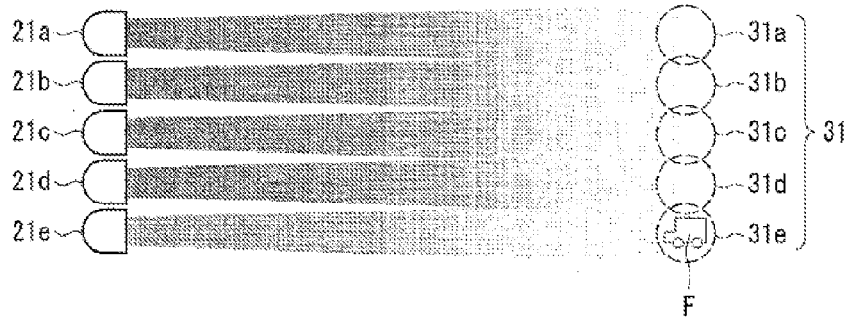
FIG. 10B is a schematic view illustrating an operational state of a light source unit that is controlled in its quantity of light by the processes illustrated in FIG. 9.

Next described is a process of individually controlling the quantity of light of the light source units 21a to 21e in the light-projecting device 120, with reference to FIG. 9 to FIG. 10B. FIG. 9 is a flow chart illustrating a series of processes for individually controlling the quantity of light of the light source units 21a to 21e provided by the light-projecting device 120, and FIG. 10A and FIG. 10B are schematic views illustrating an operational state of the light source units 21a to 21e that are controlled in its quantity of light by the processes shown in FIG. 9.

As illustrated in FIG. 9, when the light source units 21a to 21e are lighted on, the camera 30 starts capturing a moving image around the illuminated region 31 (S1). At this time, the camera 30 captures the front direction of the loaded vehicle at an angle of view that allows for capturing an entire illuminated region 31 that the light source units 21a to 21e project light to, and outputs the captured moving image to the light quantity adjustment section 40.

Next, the object detection section 41 analyzes the moving image captured by the camera 30 and detects an object inside the light-projected spots 31a to 31e (S2). More specifically, when the moving image is obtained from the camera 30, the object detection section 41 detects an object for every detection region in the moving image corresponding to the light-projected spots 31a to 31e.

When an object is detected inside the detection region, the object detection section 41 outputs a detection signal indicative of the detection region from which the object is detected, to the identification section 42. In a case illustrated in FIG. 10A, the object detection section 41 outputs to the identification section a detection signal indicative of a detection region corresponding to the light-projected spot 31e.

Next, the identification section 42 identifies the kind of object that is detected in the detection region, which object is indicated by the detection signal outputted from the object detection section 41 (S3). More specifically, when the detection signal is obtained from the object detection section 41, the identification section 42 extracts features such as a moving velocity, shape, position and the like of the object within the detection region, indicated by the detection signal, and finds a feature value which is the features made into a numerical value.

The identification section 42 refers to the reference value table, and retrieves a reference value that has a difference with the found feature value within a predetermined threshold. When the identification section 42 identifies a reference value that has a difference with the found feature value within the predetermined threshold, the identification section 42 determines that the object detected by the object detection section 41 is the object that is indicated by that identified reference value.

The identification section 42 outputs, based on the determined result, an identification signal indicative of (i) the kind of object indicated by the reference value and (ii) a detection region from which the object is detected, to the light quantity control section 43. In the case as illustrated in FIG. 10(a), the identification section 42 determines that the kind of object is an oncoming vehicle F and together outputs to the light quantity control section 43 an identification signal indicative of the detection region corresponding to the light-projected spot 31e, in which region the oncoming vehicle F is detected.

Next, in response to the kind of object indicated by the identification signal outputted from the identification section 42, the light quantity control section 43 individually controls the quantity of light of the light source units 21a to 21e that project light toward the light-projected spots 31a to 31e corresponding to the detection region (S4). More specifically, when the kind of object indicated by the identification signal outputted from the identification section 42 is the oncoming vehicle, leading vehicle or the like, the light quantity control section 43 causes the output of the light source unit 21e to be reduced, which light source unit 21e projects light to the light-projected spot 31e corresponding to the detection region in which the oncoming vehicle F is detected, as illustrated in FIG. 10B. This reduces the occurrence of irritating glare and dazzling given toward a driver (user) and the like of the oncoming vehicle F, thereby allowing achievement of a safe and comfortable traffic environment.

On the other hand, when the kind of object indicated by the identification signal outputted from the identification section 42 is the traffic sign, the obstacle or the like, the light quantity control section 43 raises the output of the light source units 21a to 21e that projects light to the light-projected spots 31a to 31e corresponding to the detection region in which the traffic sign or obstacle is detected. This makes the traffic sign or obstacle be illuminated brightly, thereby allowing for accurate reading of the traffic sign or accurate recognition of an obstacle or the like by eyesight. As a result, it is possible to achieve a safe traffic environment.

The method of identifying the kind of the object in the moving image is not limited to the foregoing, and a well known technique may also be applied.

Moreover, the reference value table may manage, other than the reference values corresponding to the oncoming vehicle, leading vehicle, traffic signs, obstacle, and the like, reference values corresponding to, for example, a pedestrian, a light vehicle (e.g. bicycle), or a motorcycle. This makes it possible to carry out optimum light quantity control in response to the kind of object identified by the identification section 42. The processes of individually controlling the quantity of light of the light source units 21a to 21e with respect to the pedestrian, light vehicle, motorcycle or the like, is described in detail in Embodiment 3 described later.

As described above, the light-projecting device 120 according to the present embodiment includes light source units 21a to 21e, each of which includes (i) a light emitting section 4 that emits light upon receiving a laser beam and (ii) a reflector 25 provided corresponding to the light emitting section 4 and which distributes the light from the light emitting section 4 to a part of an illuminated region 11, each of the light source units 21a through 21e projecting the light from the light emitting section 4 to the light-projected spots 31a to 31e, which light-projected spots 31a to 31e are partitioned regions of the illuminated region 11, and the illuminated region 31 being formed by combining a plurality of the light-projected spots 31a to 31e that are projected with light by its respective light source units 21a to 21e, and further includes a light quantity control section 43 that individually controls a quantity of light of the light source units 21a to 21e.

The light-projecting device 120 individually controls the quantity of light of the light source units 21a to 21e. This thus enables adjustment of the quantity of light for every light-projected spot 31a to 31e, each of which correspond to a respective one of the light source units 21a to 21e.

Hence, according to the present embodiment, it is possible to accomplish a light-projecting device 120 that is capable of controlling the quantity of light optimum for each region in the illuminated region 31 in which a region to be made bright is illuminated sufficiently bright, whereas for a region which is to be held down in brightness, that region is illuminated darkly.

Moreover, the light-projecting device 120 according to the present embodiment further includes an object detection section 41 that detects an object inside the light-projected spots 31a to 31e, and when the object detection section 41 detects an object, the light quantity control section 43 individually controls the quantity of light of the light source unit, which light is to be projected to the light-projected spots 31a to 31e in which the object is detected.

According to the light-projecting device 120, the light quantity control section 43 can control the amount of light projected to the object detected by the object detection section 41. Therefore, it is possible to increase or decrease the quantity of light that is projected to the detected object.

Moreover, the light-projecting device 120 according to the present embodiment further includes an identification section 42 that identifies, by image recognition, the kind of object detected by the object detection section 41, and the light quantity control section 43, in response to the kind of object identified by the identification section 42, individually controls the quantity of light of the light source unit, which light is to be projected to the light-projected spots 31a to 31e in which the object is detected.

According to the light-projecting device 120, the quantity of light projected to the object can be controlled in response to the kind of object identified by the identification section 42. Hence, it is possible to control the quantity of light such as increasing or decreasing the quantity of light that is projected to the object, in response the kind of object.

Next described is a modification of the light-projecting device 120 according to the present embodiment, with reference to FIG. 11A to FIG. 14.

Figure 11A:
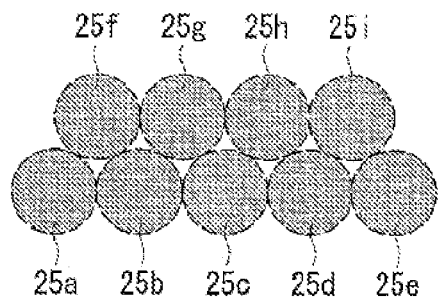
FIG. 11A is a front view illustrating a disposition example of a reflector provided in the light-projecting device illustrated in FIG. 7.
Figure 11B:
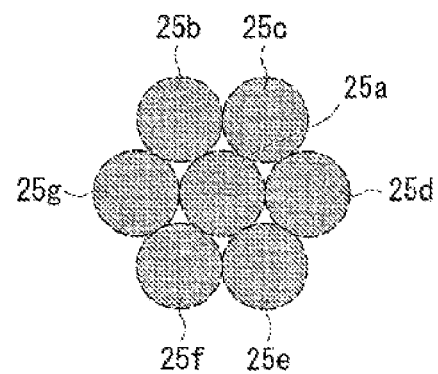
FIG. 11B is a front view illustrating another disposition example of a reflector provided in the light-projecting device illustrated in FIG. 7.

FIG. 11A and FIG. 11B are front views illustrating a disposition example of the reflector 25 provided in the light-projecting device 120.

As illustrated in FIG. 11A, in a case in which reflectors 25a to 25i are disposed, the reflectors 25a to 25i are disposed so that the reflectors 25a to 25e are aligned in one line, and that the reflectors 25f to 25i are aligned in a zigzag manner on the line of the reflectors 25a to 25e. This allows for forming the illuminated region 13 corresponding to the set region B illustrated in FIG. 5B.

Moreover, as illustrated in FIG. 11B, in a case in which the reflectors 25a to 25g are disposed, the reflectors 25b to 25g may be disposed along an outer circumference of the reflector 25a, so as to surround the reflector 25a.

Figure 12:
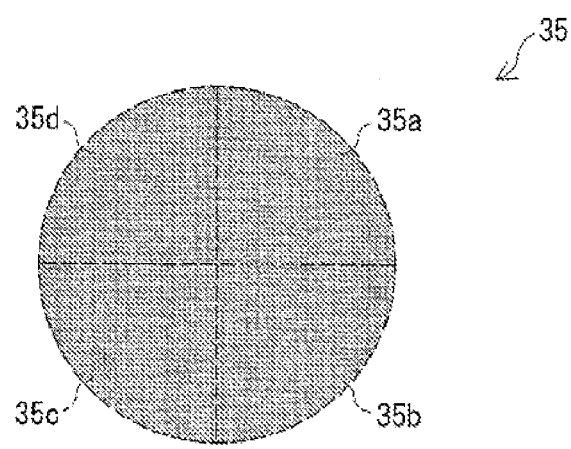
FIG. 12 is a front view illustrating a modification of yet another reflector provided in the light-projecting device illustrated in FIG. 7.

FIG. 12 is a front view illustrating yet another modification of the reflector 25 provided in the light-projecting device 120. As illustrated in FIG. 12, in the reflector 35, its inside of one large parabola mirror is divided into four regions of 35a to 35d, and the quantity of light can be individually controlled for each of the regions 35a to 35d. Namely, a light emitting section 4 is disposed for every one of the regions 35a to 35d in the reflector 35, and each of the regions function as an independent light source unit.

Therefore, according to the reflector 35, it is possible to reduce the size of the device configuration as well as improving the degree of freedom in its design.

Described below is a third embodiment of the light-projecting device according to the present invention, with respect to FIG. 13 to FIG. 15B. The present embodiment describes a light-projecting device 140 that causes the light projected to a pedestrian or the like to blink, to attract attention of the pedestrian or the like to an approaching of a loaded vehicle.

Note that members identical to the foregoing embodiments are provided with identical reference signs, and their descriptions have been omitted.

Figure 13:
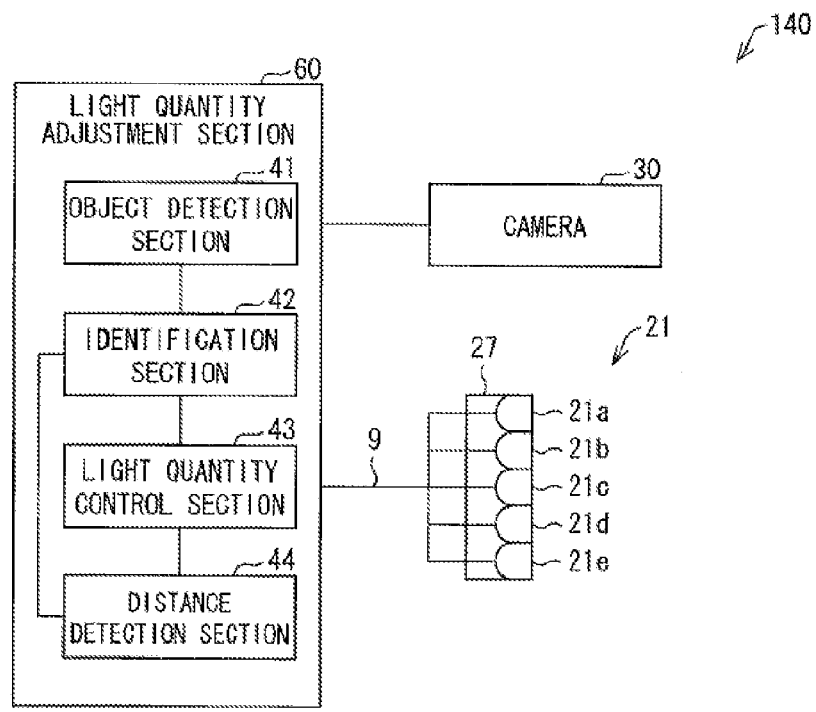
FIG. 13 is a block diagram schematically illustrating a configuration of a light-projecting device according to Embodiment 3.

First described is a configuration of the light-projecting device 140 according to the present embodiment, with reference to FIG. 13.

FIG. 13 is a block diagram schematically illustrating a configuration of the light-projecting device 140 according to the present embodiment. As illustrated in FIG. 13, the light-projecting device 140 includes a light source unit 21, a camera 30, and a light quantity adjustment section 60.

Light Quantity Adjustment Section 60

The light quantity adjustment section 60 controls the quantity of light of the light source units 21a to 21e based on the moving image captured by the camera 30. The light quantity adjustment section 60 differs from the light quantity adjustment section 40 of Embodiment 2 in the point that it further includes a distance detection section 44.

The distance detection section 44 detects a distance between an object captured by the camera 30 and the loaded vehicle. More specifically, when an identification signal indicating that the object is a pedestrian, light vehicle, motorcycle or the like (hereinafter, referred to as pedestrian etc.) is outputted from the identification section 42, the distance detection section 44 analyzes the moving image captured by the camera 30 and detects a distance between the pedestrian etc. and the loaded vehicle. Thereafter, the distance detection section 44 outputs the detected distance between the pedestrian etc. and the loaded vehicle, to the light quantity control section 43.

The light quantity control section 43 individually controls the quantity of light projected to the light-projected spots 31a to 31e corresponding to the detection region, in accordance with a kind of object indicated by the identification signal that is outputted from the identification section 42. More specifically, when the kind of object identified by the identification signal outputted from the identification section 42 is a pedestrian etc., the light quantity control section 43 controls so that the light source unit projecting light to the light-projected spot corresponding to the detection region in which the pedestrian etc. is detected is blinked.

For example, the light quantity control section 43 causes a specific light source unit(s) 21a to 21e to blink, by modulating an electric current supplied to the laser element 2 provided in the light source units 21a to 21e.

Figure 14:
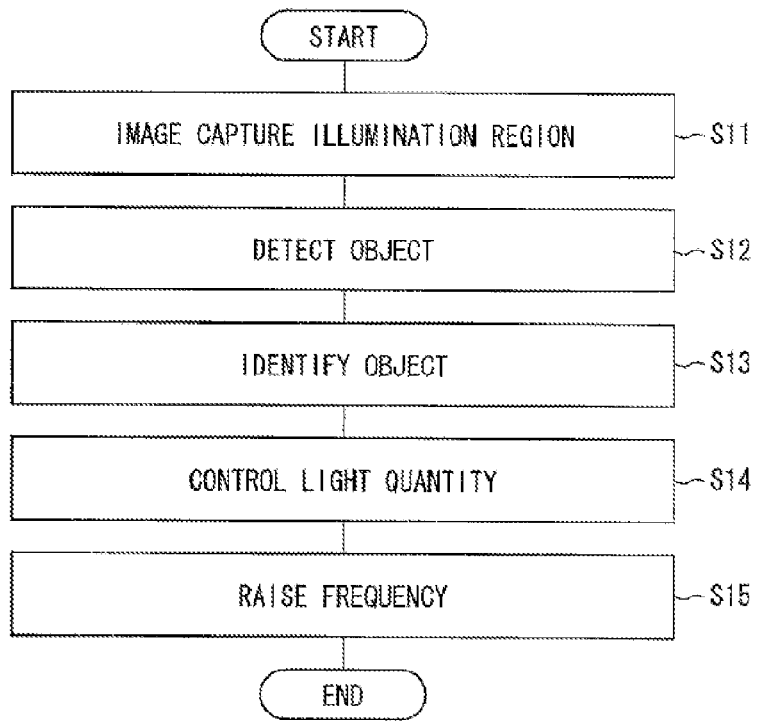
FIG. 14 is a flow chart illustrating a series of processes for individually controlling quantities of light of the light source unit provided in the light-projecting device illustrated in FIG. 13.
Figure 15A:
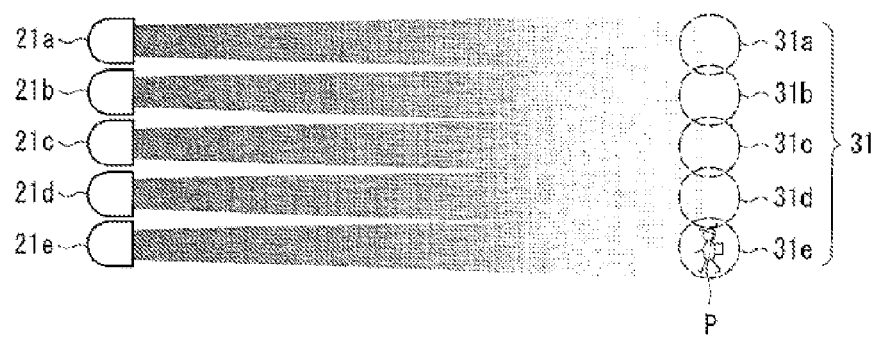
FIG. 15A is a schematic view illustrating an operational state of a light source unit that is controlled in its quantity of light by the processes illustrated in FIG. 14.
Figure 15B:
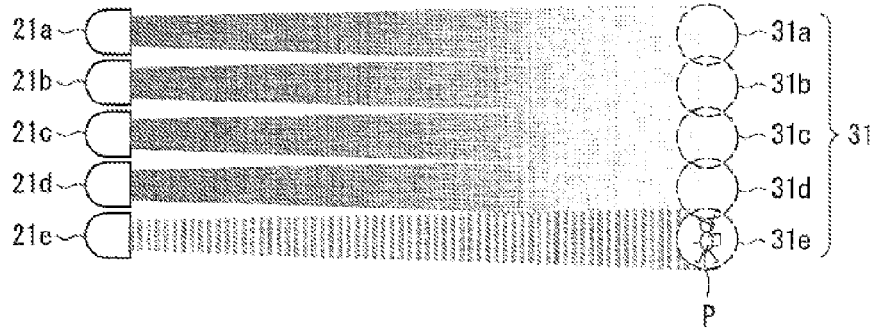
FIG. 15B is a schematic view illustrating an operational state of a light source unit that is controlled in its quantity of light by the processes illustrated in FIG. 14.

Next described are processes of controlling the quantity of light of the light source units 21a to 21e in the light-projecting device 140, with reference to FIG. 14 to FIG. 15B.

FIG. 14 is a flow chart illustrating the procedures carried out to individually control the quantity of light of the light sources unit 21a to 21e provided in the light-projecting device 140, and FIG. 15A and FIG. 15B are schematic views illustrating an operational state of the light source units 21a to 21e in which the quantity of light is controlled by the processes shown in FIG. 14.

As illustrated in FIG. 14, when the light source units 21a to 21e are lighted on, the camera 30 starts to capture a moving image of the surroundings of the illuminated region 31 (S11). At this time, the camera 30 captures a forward direction of the loaded vehicle in an angle of view capable of capturing the entire illuminated region 31 to which the light source units 21a to 21e project light, and output the captured moving image to the light quantity adjustment section 60.

Next, the object detection section 41 analyzes the moving image captured by the camera 30, and detects an object inside the light-projected spots 31a to 31e (S12). More specifically, upon obtaining a moving image from the camera 30, the object detection section 41 detects an object in every detection region in the moving image, which each detection region corresponds to a respective one of the light-projected spots 31a to 31e.

Thereafter, when an object is detected in the detection region, the object detection section 41 outputs, to the identification section 42, a detection signal indicative of the detection region in which the object is detected. In a case as illustrated in FIG. 15(a), the object detection section 41 outputs, to the identification section 42, a detection signal indicative of a detection region corresponding to the light-projected spot 31e.

Next, the identification section 42 identifies the kind of the object detected in the detection region, which object is indicated by the detection signal outputted from the object detection section 41 (S13). More specifically, when the detection signal is obtained from the object detection section 41, the identification section 42 extracts features such as a moving velocity, shape, position and the like of the object within the detection region indicated by the detection signal, and finds a feature value that is a numerical value of the features.

Thereafter, the identification section 42 refers to the reference value table, to retrieve a reference value whose difference with the found feature value is within a predetermined threshold. When a reference value that has a difference with the found feature value within the predetermined threshold is identified, the identification section 42 determines the object indicated by that reference value as the object detected by the object detection section 41.

The identification section 42, based on the determination result, outputs an identification signal that is indicative of the kind of object indicated by the reference value and the detection region in which the object is detected, to the light quantity control section 43 and the distance detection section 44. In a case as illustrated in FIG. 15A, the identification section 42 determines that the kind of object is a pedestrian P. Thereafter, the identification section 42 outputs a detection signal indicative of the detection region corresponding to the light-projected spot 31e in which the pedestrian P is detected, to the light quantity control section 43 and the distance detection section 44.

Next, the light quantity control section 43 individually controls the quantity of light projected, for each of the light-projected spots 31a to 31e corresponding to the detection region, based on the kind of the object indicated by the identification signal outputted from the identification section 42 (S14). More specifically, when the kind of object indicated by the identification signal outputted from the identification section 42 is the pedestrian P, the light quantity control section 43 controls so that the light source unit 21e projecting light to the light-projected spot 31e corresponding to the detection region in which the pedestrian P is detected is blinked, as illustrated in FIG. 15B. This enables to attract attention of the pedestrian P to an approaching loaded vehicle while not giving excess glairiness to the pedestrian P, and can also notify the driver of the loaded vehicle, of the presence of the pedestrian P.

Here, it is preferable that the frequency to blink the light source unit 21e is not less than 1 Hz but not more than 10 Hz. By having the frequency to blink the light source unit 21e to be not less than 1 Hz but not more than 10 Hz, it makes it easier for the pedestrian P, the driver of the loaded vehicle and the like to recognize the blinking of the light source unit 21e. Hence, it is possible to notify the approaching of the loaded vehicle to the pedestrian P, or to notify the presence of the pedestrian P to the loaded vehicle, more effectively.

Subsequently, based on the change in distance between the pedestrian P and the loaded vehicle, which distance is outputted from the distance detection section 44, the light quantity control section 43 changes the frequency that causes the blinking of the light source unit 21e. More specifically, as the distance between the pedestrian P and the loaded vehicle detected by the distance detection section 44 shortens, the light quantity control section 43 raises the frequency for blinking the light source unit 21e (S15). For example, in the case in which the pedestrian P is far away, the frequency to cause the blinking of the light source unit 21e is made to be around 3 Hz, and by gradually increasing the frequency that causes the light source unit 21e to blink to be up to around 30 Hz when the pedestrian P is approached the most, a high effect of attracting attention of the pedestrian P and the driver to danger is attainable.

Hence, it is possible to effectively notify the pedestrian P, the driver or the like, of the approach of the loaded vehicle or the presence of the pedestrian P.

As described above, in the light-projecting device 140 according to the present embodiment, when it is identified by the identification section 42 that the object is the pedestrian P etc., the light quantity control section 43 causes each the light source units 21a to 21e that project light towards the respective one of the light-projected spots 31a to 31e in which the pedestrian P etc is detected, to individually blink.

The light-projecting device 140 causes the light source units 21a to 21e that project light to the light-projected spots 31a to 31e in which the pedestrian P etc. is detected, to individually blink. This allows for attracting attention of the pedestrian P etc. to the approaching of the loaded vehicle, without giving excess glairiness to the pedestrian P or the like, and further can notify the driver of the loaded vehicle, of the presence of the pedestrian P and the like.

Moreover, in the light-projecting device 140, the light quantity control section 43 raises the frequency for blinking the light source units 21a to 21e, as the distance between the pedestrian P and the loaded vehicle detected by the distance detection section 44 shortens. Hence, it is possible to effectively notify the pedestrian P, the driver and the like, of the approaching of the loaded vehicle or the presence of the pedestrian P or the like.

Described below is the fourth embodiment of the light-projecting device according to the present invention, with reference to FIG. 16 to FIG. 21. The present embodiment describes a light-projecting device 160 that changes an illuminated range in response to a traveling condition of the loaded vehicle.

Members identical to the foregoing embodiments are provided with identical reference signs, and their descriptions have been omitted.

Figure 16:
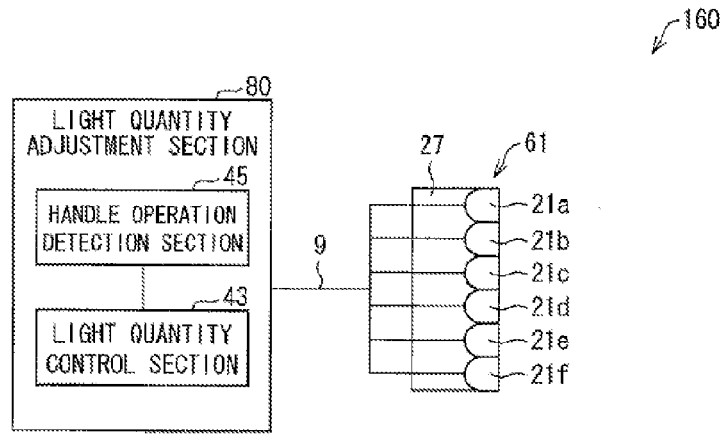
FIG. 16 is a block diagram schematically illustrating a light-projecting device according to Embodiment 4.

First described is the configuration of the light-projecting device 160 according to the present embodiment, with reference to FIG. 16.

FIG. 16 is a block diagram schematically illustrating the configuration of the light-projecting device 160 according to the present embodiment. As illustrated in FIG. 16, the light-projecting device 160 includes a light source unit 61 and a light quantity adjustment section 80.

Light Source Unit 61

The light source unit 61 includes six light source units 21a to 21f. The light source units 21a to 21f are aligned in one line in a horizontal direction, and is cased inside a chassis 27.

The light quantity adjustment section 80 individually controls the quantity of light of each of the light source units 21a to 21f, in response to a traveling condition of the loaded vehicle on which the light-projecting device 160 is loaded. The light quantity adjustment section 80 includes a handle operation detection section 45 and a light quantity control section 43.

The handle operation detection section 45 detects handle operation carried out by the driver. More specifically, the handle operation detection section 45 detects a handle operated amount (steering angle) of the driver, and determines whether or not the detected operated amount is not less than a predetermined threshold. When the detected operated amount is not less than the predetermined threshold, the handle operation detection section 45 outputs a detection signal indicative of a direction (left or right) in which the handle is turned, to the light quantity control section 43.

The light quantity control section 43 individually controls the quantity of light of the light source units 21a to 21f. The light quantity control section 43 lights on the light source units 21b to 21e when the loaded vehicle is traveling straight forward, and lights on the light source unit 21a or 21f in response to the detection signal outputted from the handle operation detection section 45. More specifically, when the detection signal is outputted from the handle operation detection section 45, the light quantity control section 43 controls to light on the light source unit 21a or 21f disposed on the side on which the handle is turned as indicated in the detection signal, to illuminate the direction that the loaded vehicle turns.

Figure 17:
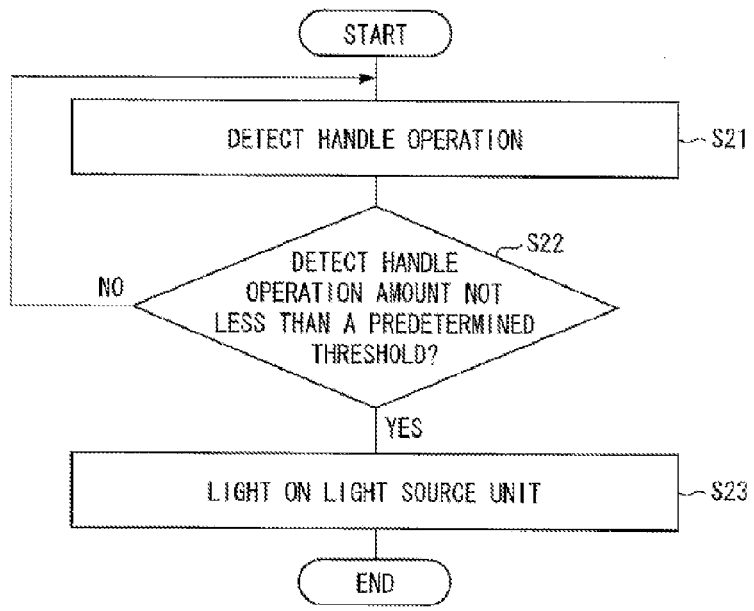
FIG. 17 is a flow chart illustrating a series of processes for controlling lighting of a light source unit provided in the light-projecting device illustrated in FIG. 16.
Figure 18A:
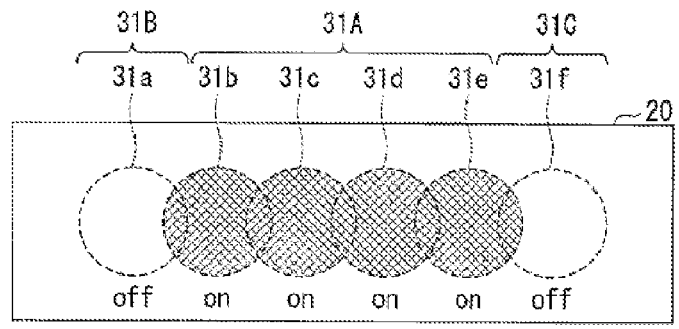
FIG. 18A is a schematic view for describing a lighted state of the light source unit, and illustrates an illuminated region on a master flat plane when moving straight forward.
Figure 18B:
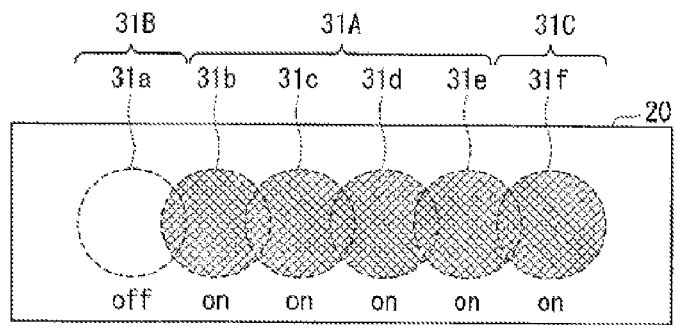
FIG. 18B is a schematic view for describing a lighted state of the light source unit, and illustrates an illuminated region on a master flat plane when turning right.
Figure 19:
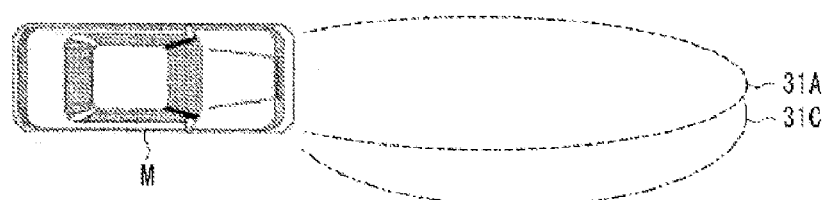
FIG. 19 is a top view illustrating the illuminated region at the time of turning right as illustrated in FIG. 18B.

Next described is the lighting control of the light-projecting device 160, with reference to FIG. 17 to FIG. 19.

FIG. 17 is a flow chart of procedures carried out to control the lighting of the light source units 21a to 21f provided in the light-projecting device 160 illustrated in FIG. 16. FIG. 18A and FIG. 18B are schematic views for describing a lighted state of the light source units 21a to 21f; FIG. 18A illustrates an illuminated region on the master flat plane 20 at a time of traveling straight forward, and FIG. 18B illustrates an illuminated region on the master flat plane 20 at a time of turning right.

As illustrated in FIG. 17, when the light source units 21b to 21e are lighted on, the handle operation detection section 45 starts to detect a handle operation of the driver (S21). At this time, as illustrated in FIG. 18A, the illuminated region on the master flat plane 20 at the time of traveling straight forward is the illuminated region 31A (first illuminated region) formed by the light-projected spots 31b to 31e.

Next, the handle operation detection section 45 detects the handle operation of the driver, and determines whether or not the detected operated amount is not less than a predetermined threshold (S22). When the handle operated amount is not less than the predetermined threshold (YES in S22), the handle operation detection section 45 outputs to the light quantity control section 43 a detection signal indicative of a direction that the handle is turned.

On the other hand, when the detected handle operated amount is less than the predetermined threshold (NO in S22), the handle operation detection section 45 does not output a detection signal, and continues the detection of the handle operation.

Next, when the detection signal is outputted from the handle operation detection section 45, the light quantity control section 43 lights on (a) the light source unit 21a that projects light to the light-projected spot 31a or (b) the light source unit 21f that projects light to the light-projected spot 31f, each of which is disposed in the side of the direction in which the handle is turned, as indicated by the detection signal.

For example, in a case in which the handle is turned to the right, the light quantity control section 43 causes the light source unit 21f to be lighted on, which projects light towards the light-projected spot 31f. At this time, as illustrated in FIG. 18B, the illuminated region on the master flat plane 20 is a combination of the illuminated region 31A formed by the light-projected spots 31b to 31e and an illuminated region 31C (second illuminated region) formed by the light-projected spot 31f.

FIG. 19 is a top view illustrating an illuminated region at the time of turning right, as illustrated in FIG. 18B. As illustrated in FIG. 19, by having the light source unit 21f be lighted on when turning right, it is possible to broaden the illuminated region to a direction that the loaded vehicle M is to turn. This thus enables to illuminate the direction that the loaded vehicle M is to turn, thereby improving visibility of the driver and accomplishing a safe driving environment.

When the handle is turned to the left, the light quantity control section 43 controls the light source unit 21a to project light to the light-projected spot 31a. At this time, the illuminated region on the master flat plane 20 is a combination of the illuminated region 31A formed by the light-projected spot 31b to 31e and the illuminated region 31B (second illuminated region) formed by the light-projected spot 31a, as illustrated in FIG. 18B.

As described above, in the light-projecting device 160 according to the present embodiment, when the loaded vehicle M turns left or right, the light quantity control section 43 controls the light source unit 21a or the light source unit 21f to project light to the illuminated region 31B or the illuminated region 31C, respectively, on the side to which the loaded vehicle M turns.

Therefore, the light-projecting device 160 can broaden the illuminated region in the direction that the loaded vehicle M turns.

Moreover, the light-projecting device 160 further includes the handle operation detection section 45 that detects a direction of the handle operation operated by the driver. This makes it possible to detect the direction that the loaded vehicle is to turn based on the handle operation of the driver. Therefore, it is possible to identify the traveling direction of the loaded vehicle M based on the handle operation of the driver.

Hence, according to the present embodiment, it is possible to illuminate the direction in which the loaded vehicle M turns. This allows for achieving a light-projecting device 160 that improves the visibility of the driver, thereby providing a safe driving environment.

As the method of identifying the traveling direction of the loaded vehicle M, other than detecting the handle operation by the driver, the straightness of the center line may be monitored with an onboard camera, to identify the traveling direction of the loaded vehicle M based on a change in position of the center line.

Moreover, the number of light source units that project light to the illuminated regions 31B and 31C may be one each, as exemplified in the present embodiment, or may be of a plural number.

Figure 20A:
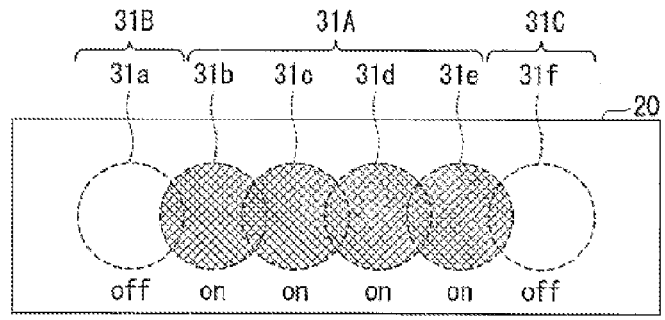
FIG. 20A is a schematic view for describing a modification of a lighted state of the light source unit, and illustrates an illuminated region on a master flat plane when traveling at high speed.
Figure 20B:
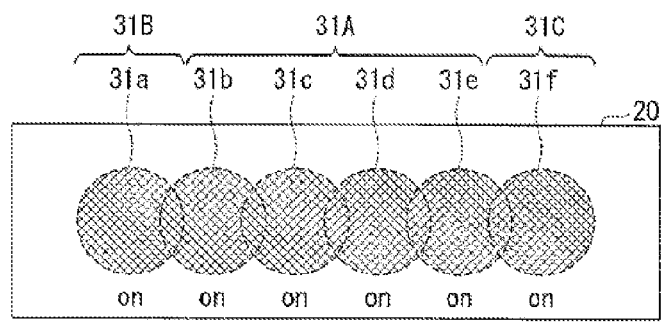
FIG. 20B is a schematic view for describing a modification of a lighted state of the light source unit, and illustrates an illuminated region on a master flat plane when traveling at low speed.
Figure 21:
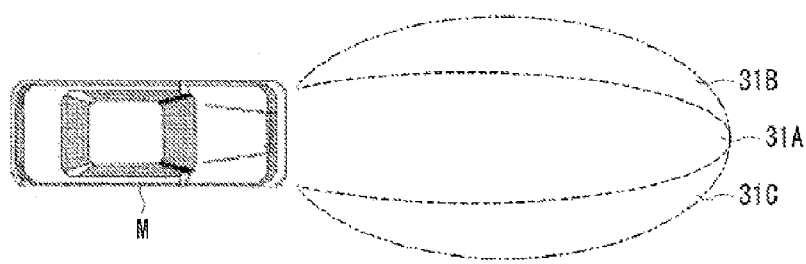
FIG. 21 is a top view illustrating the illuminated region when traveling at low speed as illustrated in FIG. 20B.

Next described is a modification of the light-projecting device 160 according to the present embodiment, with reference to FIG. 20A to FIG. 21.

In the foregoing description, the light quantity control section 43 lights on one of the light source units 21a and 21f in response to the traveling direction of the loaded vehicle M. However, for example, the light source units 21a and 21f may be lighted simultaneously, in response to the traveling speed of the loaded vehicle M.

FIG. 20A and FIG. 20B are schematic views for describing modifications of the lighted states of the light source units 21a to 21f; FIG. 20A illustrates an illuminated region on the master flat plane 20 when traveling at high speed, and FIG. 20B illustrates an illuminated region on the master flat plane 20 when traveling at low speed.

The light quantity control section 43 lights on the light source units 21b to 21e when the traveling speed of the loaded vehicle M is higher than a predetermined speed. At this time, as illustrated in FIG. 20A, the illuminated region on the master flat plane 20 is the illuminated region 31A (first illuminated region) formed by the light-projected spots 31b to 31e.

On the other hand, when the traveling speed of the loaded vehicle M is not more than a predetermined speed, the light quantity control section 43 lights the light source units 21a and 21f simultaneously. At this time, as illustrated in FIG. 20B, the illuminated region on the master flat plane 20 is a combination of the illuminated region 31A formed by the light-projected spots 31b to 31e, the illuminated region 31B (second illuminated region) formed by the light-projected spot 31a, and the illuminated region 31C (second illuminated region) formed by the light-projected spot 31f.

FIG. 21 is a top view illustrating an illuminated region at the time of traveling at low speed, as illustrated in FIG. 20B. As illustrated in FIG. 21, by simultaneously lighting on the light source units 21a and 21f when traveling at a low speed, it is possible to illuminate a wide range including the surroundings of the forward direction of the loaded vehicle M.

Therefore, switching over is possible in such a manner that at the time of traveling at high speed such as on an expressway or the like, the light source units 21a and 21f are turned off and just the forward direction of the loaded vehicle M is illuminated, and when the loaded vehicle M is traveling at a low speed such as in an urban area, the light source units 21a and 21f are simultaneously lighted on to illuminate a broad range including the surroundings of the forward direction of the loaded vehicle M.

Since it is possible to illuminate a required range in response to the traveling speed of the loaded vehicle, it is possible to achieve both the accomplishment of a safe driving environment and the reduction of electricity consumption of the light-projecting device 160.

Described below is a fifth embodiment of the light-projecting device according to the present invention, with reference to FIG. 22 to FIG. 24. The present embodiment describes a light-projecting device 180 that possesses light distribution characteristics enabling illumination of a predetermined set region, even if one light source unit breaks down.

Note that members identical to the foregoing embodiments are provided with identical reference signs, and their descriptions have been omitted.

Figure 22:
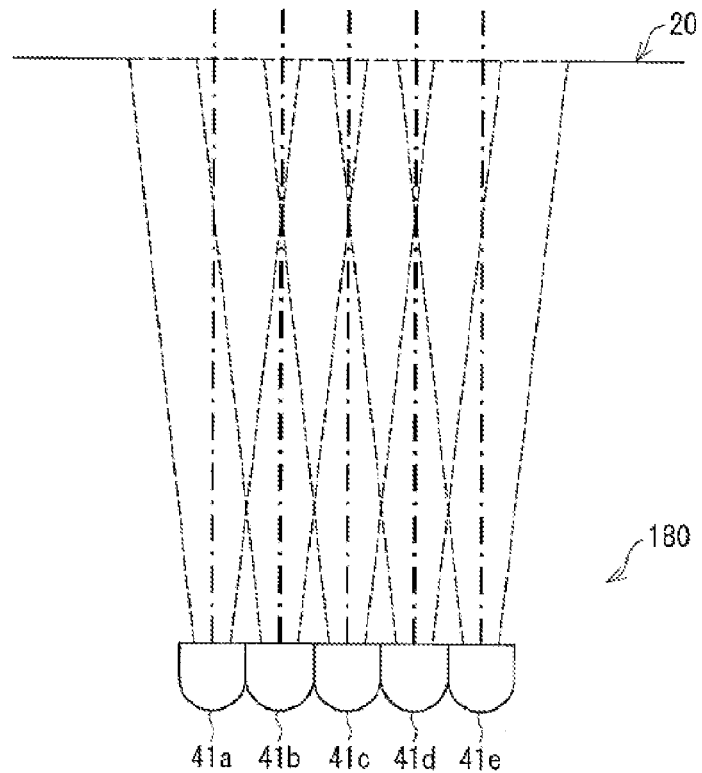
FIG. 22 is a plan view schematically illustrating a light-projecting device according to Embodiment 5.

FIG. 22 is a plan view illustrating a configuration of the light-projecting device 180 of the present embodiment. As illustrated in FIG. 22, the light-projecting device 180 includes a plurality of (five in the embodiment) light source units 41a to 41e. The configuration of each of the light source units 41a to 41e are substantially identical to the light source unit 21a illustrated in FIG. 8.

In FIG. 22, optical axes (central axes) of light projected from the light source units 41a to 41e are illustrated by alternate long and short dash lines. Moreover, ranges (solid angle in which the pencil of rays remain within) of light distributed from the light source units 41a to 41e are shown by the broken lines. In the embodiment, the light-projecting device 180 is disposed in the loaded vehicle so that the five light source units 41a to 41e are disposed in level.

Figure 23:
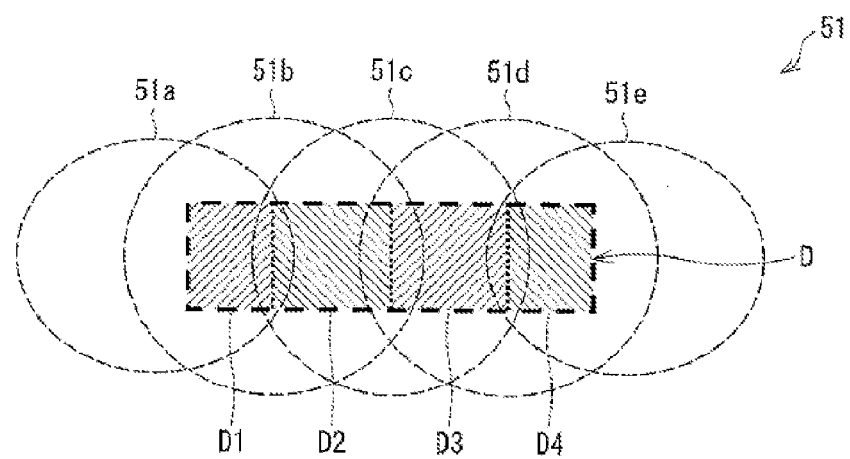
FIG. 23 is a schematic view illustrating an illuminated region in which light is projected on a master flat plane by the light-projecting device illustrated in FIG. 22.

Next described is the light distribution characteristics of the light-projecting device 180, with reference to FIG. 23. FIG. 23 is a schematic view illustrating an illuminated region 51 in which light is projected on the master flat plane 20 by the light-projecting device 180. In the embodiment, a light distribution characteristics standard defines, as light distribution characteristics of the master flat plane 20, a rectangular set region D as a predetermined region required for projecting light for example. Namely, when the light-projecting device 180 is lighted on, at least the set region D always requires to be illuminated with a certain illumination intensity, to check the forward direction.

With the master flat plane 20, the five light source units 41a to 41e of the light-projecting device 180 each project light to respective different light-projected spots 51a to 51e. Note that the light-projected spots 51a to 51e may differ in shape and size.

In the embodiment, the light-projected spots 51a to 51e are determined in position so that light-projected spots adjacent to each other partially overlap. For example, the light-projected spot 51a corresponding to the light source unit 41a has a region that overlaps the adjacent light-projected spot 51b corresponding to the light source unit 41b. Moreover, the light-projected spot 51b corresponding to the light source unit 41b has a region overlapping the adjacent light-projected spot 51c corresponding to the light source unit 41c. The light source units 41a to 41e are disposed so that center positions of the light-projected spots 51a to 51e are positioned within other adjacent light-projected spots.

The set region D to be illuminated is projected with light by the light source units 41a to 41e in a partitioning manner. In FIG. 23, lines that partition the set region D into four partial regions D1 to D4 are illustrated by the dotted lines. The partial regions D1 to D4 are regions partitioned as appropriate of the set region D, in response to the overlap of the light-projected spots 51a to 51e.

The partial region D1 of the set region D is included in the light-projected spot 51a and the light-projected spot 51b. The partial region D2 of the set region D is included in the light-projected spot 51b and the light-projected spot 51c. The partial region D3 of the set region D is included in the light-projected spot 51c and the light-projected spot 51d. The partial region D4 of the set region D is included in the light-projected spot 51d and the light-projected spot 51e. As such, in the light-projecting device 180, each of the partial regions D1 to D4 of the set region D are included in at least two light-projected spots corresponding to respective light source units. Namely, any position in the set region D is projected with light from at least two light source units.

Figure 24:
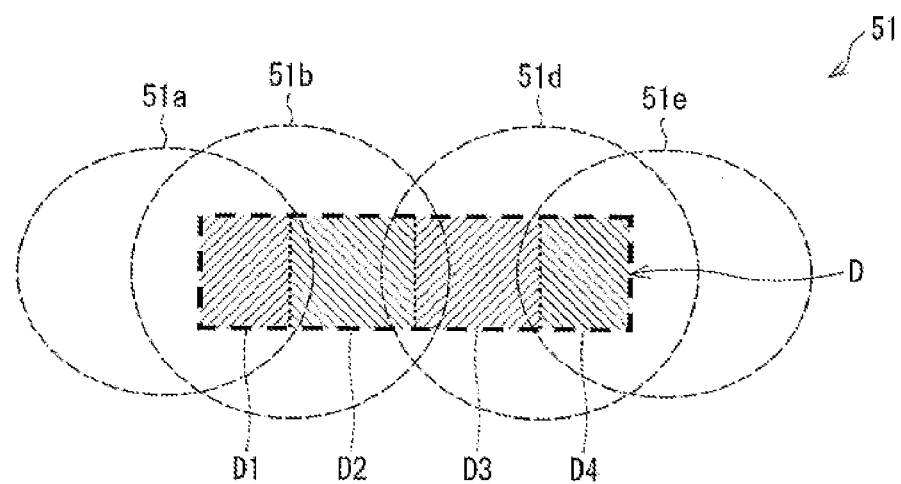
FIG. 24 is a schematic view illustrating an illuminated region in which light is projected on a master flat plane by the light-projecting device, in a case in which a part of the light source unit illustrated in FIG. 22 is broken down.

FIG. 24 is a schematic view illustrating an illuminated region 51 that is projected with light by the light-projecting device 180 on the master flat plane 20, in a case in which the light source unit 41c breaks down. There are cases in which the projection of light from the light source units 51a to 51e weaken or no light is projected therefrom, due to a breakdown of the laser element 2, deterioration of the light emitting section 4, damage to the reflector 25 or the like.

For example, when one light source unit 41c among the plurality of light source units 41a to 41e breaks down, no light is projected to the light-projected spot 51c from the light source unit 41c, and the illuminated region 51 illuminated by the light-projecting device 180 becomes as illustrated in FIG. 24. Even in the case in which the light source unit 41c breaks down, the entire set region D is included in the illuminated region 51 formed by the light-projected spots 51a, 51b, 51d, and 51e that correspond to the light source units 41a, 41b, 41d, and 41e, respectively. For example, the partial region D2 in the set region D is at least projected with light by the light source unit 41b corresponding to the light-projected spot 51b, and the partial region D3 is at least projected with light by the light source unit 41d corresponding to the light-projected spot 51d.

As such, with the light-projecting device 180 according to the present embodiment, even if any one light source unit breaks down, the entire set region D can be projected with light by the other light source units.

Hence, even in the case in which the one light source unit 21c breaks down, the other light source units 21a, 21b, 21d, and 21e project light to the entire set region D in a partitioning manner so that the entire set region D to be illuminated is projected with light. Accordingly, even if a part of the light source units breaks down in the light-projecting device 180, which light-projecting device 180 is provided as a headlamp of the loaded vehicle for traveling during night time, the predetermined set region D is projected with light in its entirety by the other light source units that are configured so as to overlap the light-projected spots.

Hence, even in a case in which a part of the light source units of the light-projecting device 180 breaks down, it is possible to maintain the light distribution characteristics that allows for safe traveling and the continuation of traveling without carrying out a replacement of components. Moreover, even if the driver does not notice the partial breakdown of the light source units, it is possible to project light to the entire set region D to be illuminated. Hence, it is possible to maintain a safe traffic environment.

Moreover, as illustrated in FIG. 23, the light-projecting device 180 projects light to the set region D in a partitioning manner, with use of a plurality of light source units 41a to 41e. This allows for easy adjustment of illumination intensity (quantity of light) for every position that corresponds to the light source units 41a to 41e.

For example, when the set region D is to be illuminated brighter around the center of the set region D and slightly darker in positions close to the left and right edges of the set region D, it is possible to adjust the illumination intensity of the light-projected spots by individually adjusting the amount of light of the corresponding light source units 41a to 41e. This allows for improving energy efficiency together with forming a desired illuminated region 51.

With the light-projecting device that projects light with use of one light source unit, it is difficult to form a complex illuminated region, and requires to shield light with use of a shielding plate or the like to form the desired illuminated region. However, the shielding the light causes a decrease in energy efficiency.

Moreover, even in the case in which light is projected with a plurality of light source units, with an overlapping type light-projecting device in which the light-projected spots of the light source units are overlapped several times and the light-projected spots of the light source units project light so that the entire set region D is included, it is difficult to form an illuminated region that projects light to the set region D in a complex pattern (distribution of illumination intensity of the set region D).

Moreover, in a case in which the set region D is not partitioned and each the light source units projects light to the entire set region D of the master flat plane 20 (the light-projected spots largely overlap each other), which master flat plane 20 is disposed at a position away from the light source units by a predetermined distance, there are cases in which the distribution of light of the light source units becomes too broad at a position further away from the master flat plane 20. In a case in which the entire set region D to be illuminated on the master flat plane 20 is projected with light from one light source unit (one reflector), the solid angle of the distribution of light from the light source unit becomes broad. This causes the distribution of light from that light source unit to broaden to a broader range at a position further away from the master flat plane 20, which as a result reduces the illumination intensity. Although the light distribution characteristics standard for cars are often set based on a master flat plane of a relatively close distance such as 10 m or 25 m ahead, in actual traveling, it is necessary to project light to a position even further away, for example 40 m or 100 m ahead.

The light-projecting device 180 according to the present embodiment includes the plurality of light source units 41a to 41e that project light to the set region D in the partitioning manner; this hence allows for easily achieving an illuminated region that differs in illumination intensity every position. Moreover, the set region D is projected with light with the plurality of light source units 41a to 41e in a partitioning manner. This allows for reducing the size of the light source units 41a to 41e. Furthermore, different from a case in which a spare lamp or the like is moved to replace a broken lamp, there is no need to provide a movable section to the light source unit; it is possible to project light in the forward direction upon fulfilling a predetermined light distribution characteristics standard even without detecting a breakdown by a breakdown detection device or the like. Moreover, since the plurality of light source units 41a to 41e project light to the set region D in the partitioning manner, it is possible to reduce the size of the solid angle of the distribution of light from the light source units 41a to 41e. Hence, the light-projecting device 180 according to the present embodiment can project light with high illumination intensity, even from a position far away from the master flat plane 20.

Moreover, the foregoing description deals with a configuration in which, for all of the plurality of the light source units, its light-projected spot overlaps the light-projected spots of the other light source units. However, it is not limited to this, and just a part of the plurality of light source units can be made so that their light-projected spots overlap the light-projected spots of the other light source units.

Here, in a case of a configuration in which the illumination intensities of the light-projected spots by the light source units differ from each other, just the light-projected spot of a light source unit that has a high illumination intensity, which light source unit has a higher possibility of breakage, may be made to overlap the light-projected spot of another light source unit. This thus allows for projecting light to the set region D so that the set region D is illuminated fully even if the light-projected spot of the light source unit having the high illumination intensity breaks down. Furthermore, the foregoing description explains a configuration in which just the light-projected spot of a part of the light source units is overlapped. However, it is not limited to this, and light may be projected to a region that requires a certain illumination intensity in the set region D, with use of two or more light source units.

Described below is a sixth embodiment of the light-projecting device according to the present invention, with reference to FIG. 25 to FIG. 31. The present embodiment describes a light-projecting device 200 that compensates for a breakdown of a part of the light source unit with another light source unit.

Note that members similar to those described in the Embodiment are provided with identical reference signs, and descriptions thereof have been omitted.

Figure 25:
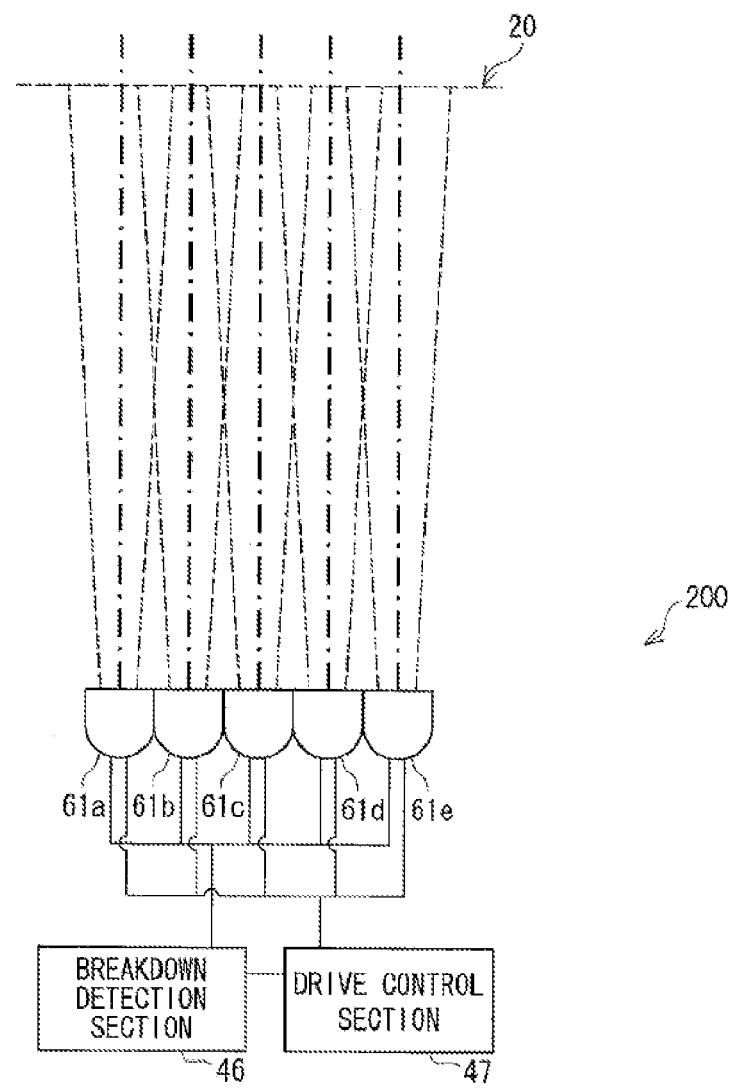
FIG. 25 is a plan view schematically illustrating a configuration of the light-projecting device according to Embodiment 6.

FIG. 25 is a plan view illustrating a configuration of the light-projecting device 200 according to the present embodiment. The light-projecting device 200 includes a plurality of (in the embodiment, five) light source units 61a to 61e. Moreover, the light-projecting device 200 includes a breakdown detection section (light projection detection section) 46 and drive control section (light projection changing section) 47. In FIG. 25, the breakdown detection section 46 and the drive control section 47 serve as functional blocks. Moreover, in FIG. 25, optical axes (central axes) of light projected from respective light source units 61a to 61e are illustrated by alternate long and short dash lines. Moreover, FIG. 25 illustrates ranges (solid angles in which the pencil of rays are emitted within) of light projected from the light source units 61a to 61e, with broken lines. In the present embodiment, the light-projecting device 200 is provided on a loaded vehicle so that the five light source units 61a to 61e are disposed in level.

Figure 27:
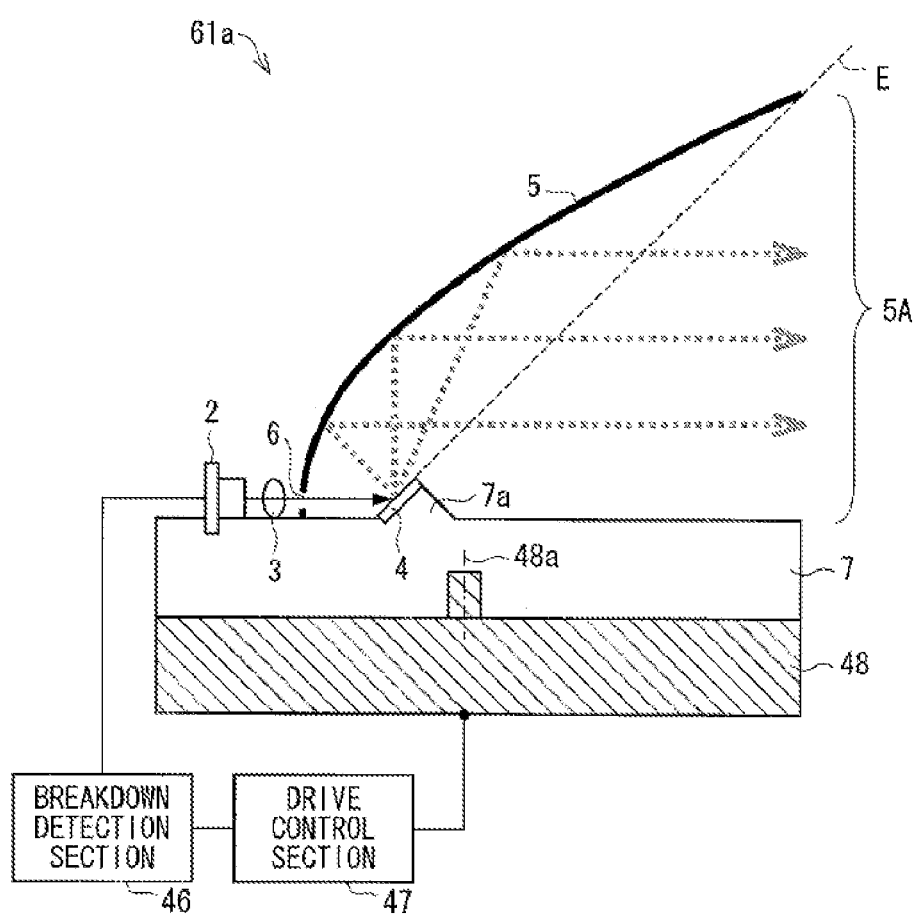
FIG. 27 is a cross sectional view schematically illustrating a configuration of a light source unit included in the light-projecting device illustrated in FIG. 25.

The following describes a detailed configuration of the light source unit 61a, with reference to FIG. 27. The light source units 61a to 61e have substantially identical configurations.

FIG. 27 is a cross sectional view schematically illustrating a configuration of the light source unit 61a of the present embodiment. The light source unit 61a includes a laser element (excitation light radiating section) 2, a converging lens 3, a light emitting section (irradiation section) 4, a reflector 5, a metal base 17, and a unit drive section (light projection changing section) 48. The configurations of the converging lens 3, the light emitting section 4, and the reflector 5 are substantially identical to those of the light source unit 1a illustrated in FIG. 3.

The laser element 2 is a laser element with a built-in monitor PD (photodiode), and can detect a breakdown of the laser element 2. The laser element 2 may be an APC (constant output) laser element or an ACC (constant current) laser element.

The metal base 17 is a supporting member that supports the light source unit 61a, and is made of metal (e.g. aluminum, copper, or iron). The metal base 17 is provided independently in each of the light source units 61a to 61e.

The breakdown detection section 46 receives an output of the monitor PD of the laser element 2 of each of the light source units 61a to 61e, and detects whether or not (the laser element 2 of) the light source units 61a to 61e is broken. The breakdown detection section 46 outputs results of detecting whether or not the light source units 61a to 61e are broken, to the drive control section 47.

A light receiving element may be provided in the internal space of the reflector 5 for each of the light source units 61a to 61e, and intensity of the fluorescence light emission of the light emitting section 4 may be monitored by making the breakdown detection section 46 receive the output of the light receiving element. In this case, both the breakdown of the laser element 2 and the deterioration of the fluorescent material of the light emitting section 4 can be detected with the light receiving element. For example, the breakdown detection section 46 may compare the output (quantity of received light) of the light receiving element inside the reflector 5 with a predetermined threshold, to determine whether or not the light source unit is broken. Moreover, for example, the breakdown detection section 46 may determine whether or not the light source units 61a to 61e are broken down by comparing the output (quantity of received light) of the light receiving element inside the reflector 5 with respect to the output (electric power or current, etc.) of the laser element 2, with a predetermined threshold.

Moreover, the light projecting state by the light-projecting device may be monitored, by including image capturing means such as a camera that monitors a forward direction of the loaded vehicle and by analyzing the captured image with the breakdown detection section 46. This makes it possible to identify a light-projected spot that became dark, which as a result identifies the broken light source unit 61a to 61e. In this case, breakdowns caused by damage to the reflector 5 and like breakdowns may also be detected. The breakdown detection section 46 is capable of, for example, identifying the light source units 61a to 61e that is broken by comparing a captured image with a predetermined pattern image, and identifying the broken light source units 61a to 61e by comparing an image while the light-projecting device 200 is lighted on and that image while the light-projecting device 200 is lighted off.

The drive control section 47 controls the unit drive section 48 of the light source units 61a to 61e, based on whether or not the light source units 61a to 61e are broken.

The unit drive section 48 supports the metal base 17 so that the metal base 17 is rotatable about a rotational axis 48a. As a result, the unit drive section 48 makes the light source unit 61a including the reflector 5 be rotatable. Moreover, the unit drive section 48 rotates the metal base 17 in response to instructions from the drive control section 47, and changes a light-projecting direction of the light source unit 61a (position of light-projected spot).

Figure 26:
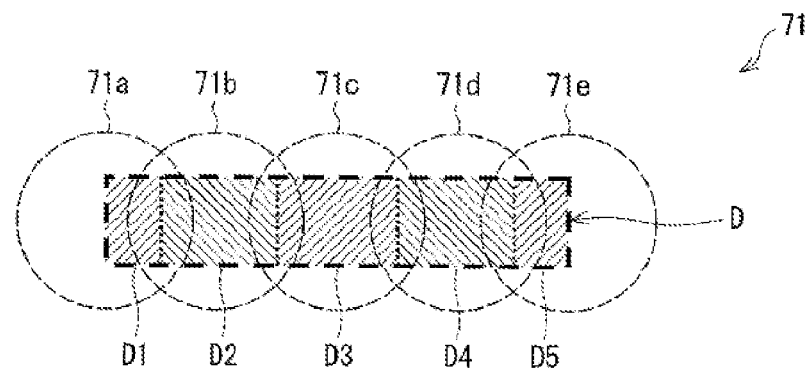
FIG. 26 is a schematic view illustrating an illuminated region in which light is projected on a master flat plane by the light-projecting device illustrated in FIG. 25.

FIG. 26 is a schematic view illustrating an illuminated region 71 on the master flat plane 20, to which light is projected by the light-projecting device 200 illustrated in FIG. 25.

On the master flat plane 20, the five light source units 61a to 61e of the light-projecting device 200 project light to light-projected spots 71a to 71e, respectively. The light-projected spots 71a to 71e may each differ in shape and size. Each of the light-projected spots 71a to 71e partially overlaps its adjacent light-projected spot(s). For example, the light-projected spot 71a corresponding to the light source unit 61a has a region that overlaps the light-projected spot 71b, which light-projected stop 71b corresponds to the adjacent light source unit 61b. Moreover, the light-projected spot 71b corresponding to the light source unit 61b has a region that overlaps the light-projected spot 71c, which light-projected spot 71c corresponds to the adjacent light source unit 61c.

The set region D to be irradiated is projected with light by the light source units 61a to 61e in a partitioning manner. In FIG. 26, lines that partition the set region D into five partial regions D1 to D5 are shown by the dotted lines. The partial regions D1 to D5 are regions partitioned as appropriate of the set region D, in accordance with the light-projected spots 71a to 71e. The partial regions D1 to D5 of the set region D are included in the light-projected spots 71a to 71e, respectively.

Different from Embodiment 5, in the present embodiment, each of the partial regions D1 to D5 of the set region D has a region that is only included in one of the light-projected spots. For example, the region around the center of the partial region D3 is overlapped by only the light-projected spot 71c corresponding to the light source unit 61c. Hence, when no light is distributed from the light source unit 61c caused by a breakdown or the like, it is necessary to compensate for the light-projected spot 71c with the other light source units 61a, 61b, 61d, and 61e.

For example, when the laser element 2 of the light source unit 61c no longer outputs a laser beam, the breakdown detection section 46 detects, based on the output of the monitor PD of the laser element 2 of the light source unit 61c, the breakdown of the laser element 2 of the light source unit 61c. When the breakdown of the laser element 2 of the light source unit 61c is detected, the breakdown detection section 46 notifies the drive control section 47 that the light source unit 61c is broken.

When the light source unit 61c is broken, the drive control section 47 controls the unit drive section 48 to rotate the light source units 61a, 61b, 61d, 61e so that the light-projected spots 71a, 71b, 71d, and 71e change in position, to cover for the light-projected spot 71c of the light source unit 61c with the other light source units 61a, 61b, 61d, and 61e. The drive control section 47 stores in advance, for each of the light source units 61a to 61e, to what degree the other light source units are rotated in the case in which that one of the light source units 61a to 61e break.

Figure 28:
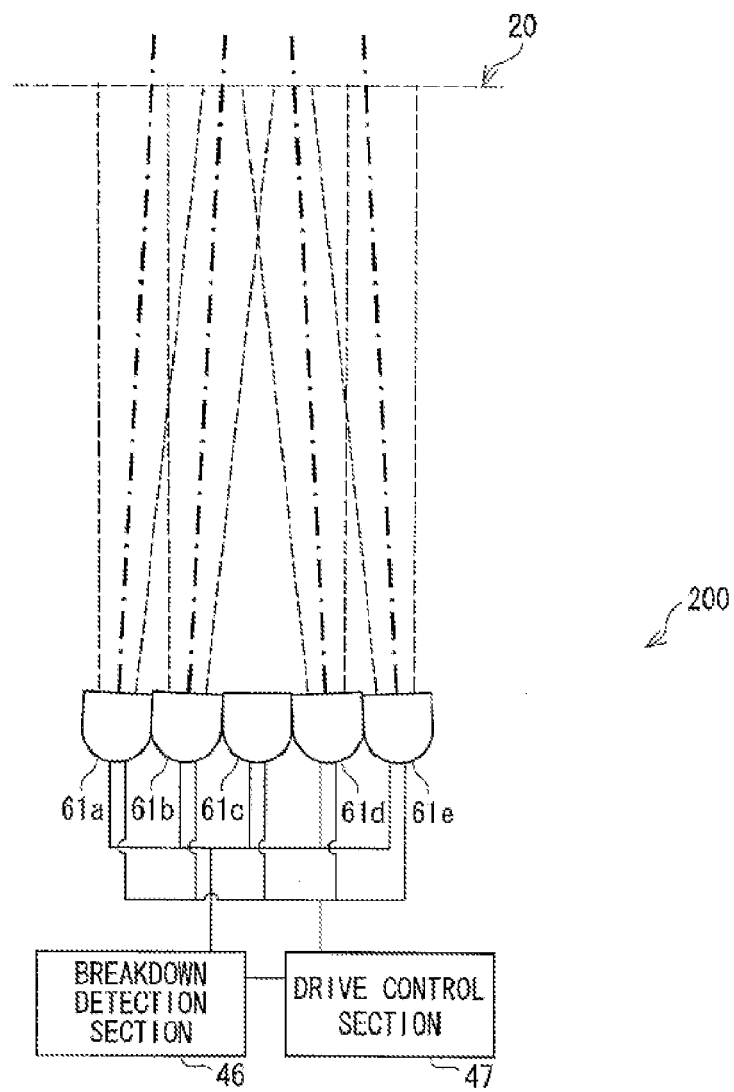
FIG. 28 is a plan view illustrating light projecting directions of other light source units when a part of the light source unit is broken down in the light-projecting device illustrated in FIG. 25.

FIG. 28 is a plan view illustrating a light distribution direction of the other light source units in the case in which the light source unit 61c is broken. The unbroken light source units 61a, 61b, 61d, and 61e are changed in its light distribution direction so as to compensate for at least a part of the light-projected spot (part included in the set region D) of the broken light source unit 61c.

Figure 29:
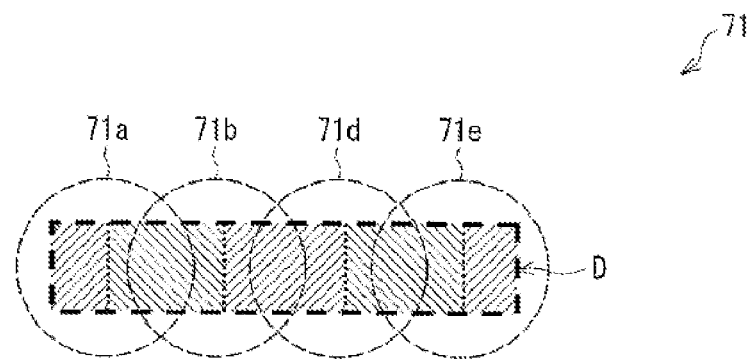
FIG. 29 is a schematic view illustrating an illuminated region in which light is projected on a master flat plane by a light-projecting device, when a part of the light source unit in the light-projecting device illustrated in FIG. 25 is broken down.

FIG. 29 is a schematic view illustrating an illuminated region 71 on the master flat plane 20, to which the light-projecting device 200 projects light in the case in which the light source unit 61c breaks down. The light-projected spots 71a, 71b, 71d, and 71e corresponding to the other light source units 61a, 61b, 61d, and 61e, respectively, are changed in position so that the center part of set region D projected with the light source unit 61c is covered. As such, any position of the set region D is included in at least one of the light-projected spots 71a, 71b, 71d, and 71e of the unbroken light source units 61a, 61b, 61d, and 61e.

Even in a case in which another light source unit instead of the light source unit 61c breaks down, the light-projected spots of the unbroken light source units are similarly changed, to distribute light to the region to which the broken light source unit would have projected light. Therefore, even in the case in which a part of the light source unit of the light-projecting device 200 breaks down, the entire predetermined set region D will be projected with light.

Hence, even in the case in which a part of the light source units of the light-projecting device 200 breaks down, it is possible to maintain the light distribution characteristics that allows for safe driving and that allows for continuously driving safely. Accordingly, it is possible to continuously drive safely without carrying out any replacement of components or the like. Note that when a part of the light source unit breaks down, the laser element 2 of the other light source unit not broken can be increased in output.

Moreover, the breakdown detection section 46 may notify the driver that the light source unit has broken down. This enables the driver to quickly realize the breakdown of the light source unit. Moreover, the configuration may be made so that an operation section (button etc.) for changing the angle of the light source unit is provided near the driver's seat, and that the drive control section changes the angle of the light source unit in response to the operation of the operation section by the driver.

Moreover, in the case in which the light source unit breaks down, the light distribution direction of the other light source units may be not adjusted automatically but may be adjusted by the driver or by a mechanic, by having the driver or the mechanic rotate the light source unit supported in a rotatable state by the unit drive section, to adjust the light distribution direction. In this case, it is possible to omit the breakdown detection section 46 and the drive control section 47.

Similarly with Embodiment 5, the light-projecting device 200 includes a plurality of light source units 61a to 61e that projects light to the set region D in a partitioning manner. Hence, it is easy to form the illuminated region 71 in which the illumination intensity differs every position.

Moreover, the set region D is projected with light by the plurality of light source units 61a to 61e in the partitioning manner. Even if one light source unit breaks down, it is possible to project light to the set region D in the partitioning manner by the other plurality of light source units. This hence allows for reducing the size of the light source units 61a to 61e.

The foregoing description deals with a configuration in which the light-projected spots of the light source units are changed by rotating the light source units (and reflectors). However, it is not limited to this, and the light-projected spots of the light source units may be modified by a different method.

For example, the configuration may be one in which the light distribution direction of the light source unit is changed by changing the position of the reflector 5 with respect to the light emitting section 4, which changes its focal position. Moreover, the configuration may be one in which by changing the laser irradiated position of the light emitting section 4, the light distribution direction from the light source unit changes.

Figure 30:
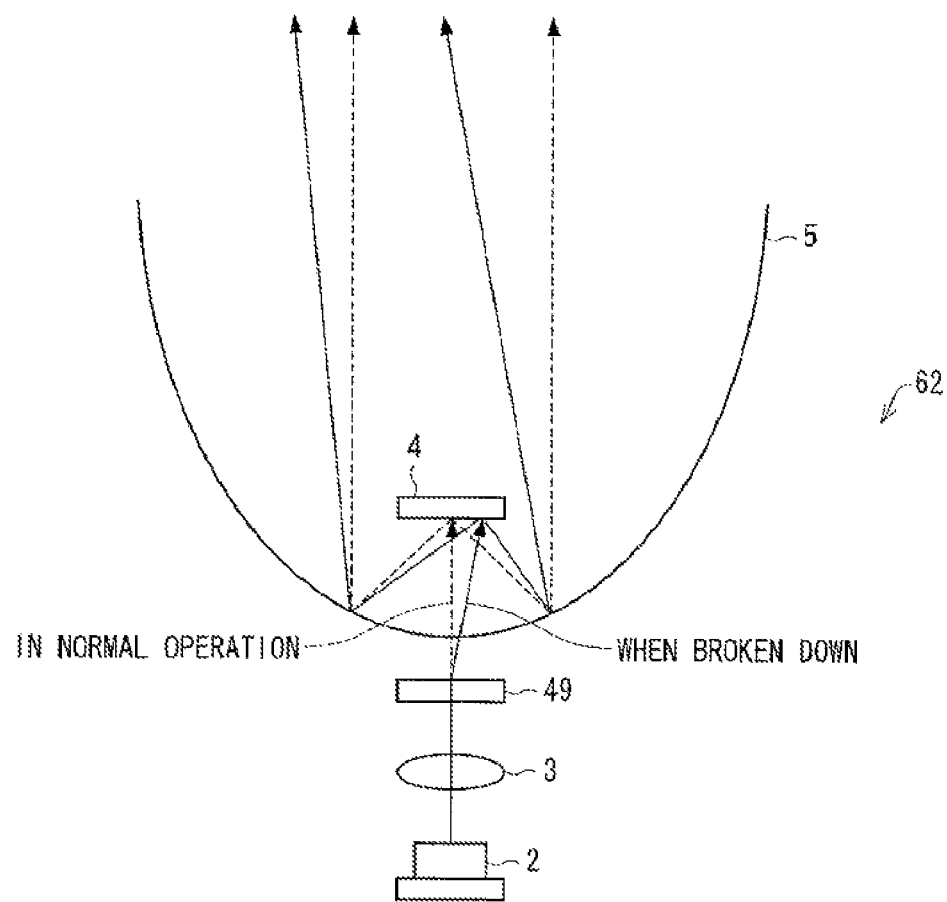
FIG. 30 is a cross sectional view illustrating an example of a light source unit that is capable of changing an irradiated position of a laser beam on the light emitting section.

FIG. 30 is a cross sectional view illustrating an example of a light source unit 62 whose laser irradiated position on the light emitting section 4 is changeable. The light source unit 62 includes an optical element (light projection changing section) 49 disposed between the converging lens 3 and the light emitting section 4, which changes the traveling direction of the laser beam. By changing the position or angle of the optical element 49, it is possible to change the traveling direction of the laser beam and change an irradiated position of the laser beam on the light emitting section 4. In this case, when one light source unit breaks down, the drive control section (not illustrated) changes the position or angle of the optical element 49 of the other light source units. This causes the angle that the laser beam is reflected on the reflector 5 to change between a normal state and a broken state, which hence causes the light distribution direction by the reflector 5 to change. As a result, it is possible to change the light-projected spot of the light source unit.

Note that the laser irradiated position on the light emitting section 4 can be changed by changing the position or angle of the laser element 2 or the converging lens 3, each with respect to the reflector 5, instead of the optical element 49.

Moreover, the configuration may be one in which, for example, the position of the converging lens (light projection changing section) 3 illustrated in FIG. 27 is changed, to broaden the solid angle of the light distribution from the light source unit and enlarge the light-projected spot of the light source unit. Moreover, the configuration may be made so that the light-projected spot of the light source unit is enlarged by changing the position of the light emitting section 4 with respect to the reflector 5 forwards or backwards from the focal position (to the side of the opening 5A or the side of the vertex of the parabolic surface of the reflector). Moreover, the configuration may be made so that the light-projected spot of the light source unit is enlarged by changing the shape of the parabolic surface of the reflector 5.

Figure 31:
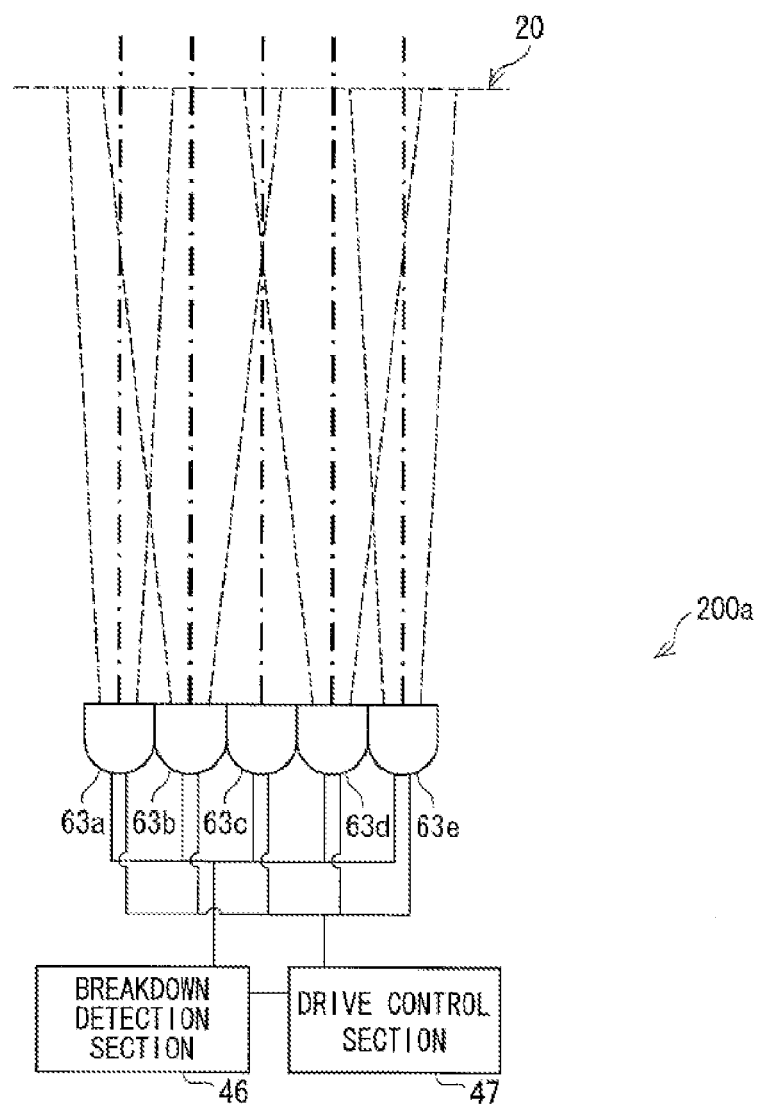
FIG. 31 is a plan view illustrating a configuration of a light-projecting device including a plurality of light source units that can enlarge their light-projected regions.

FIG. 31 is a plan view illustrating a configuration of a light-projecting device 200a including a plurality of light source units 63a to 63e that are capable of enlarging their light-projected spots. For example, in a case in which the light source unit 63c breaks down, the drive control section 47 controls to enlarge the light-projected spots of the two light source units 63b and 63d that are adjacent to the light source unit 63c, to compensate for the light-projected spot of the light source unit 63c.

When enlarging the light-projected spots of the light source unit 63b and 63d, the output of the laser element 2 of the light source units 63b and 63d may be increased. By enlarging just the light-projected spots of the light source units 63b and 63d adjacent to the broken light source unit 63c on either side, it is possible to efficiently compensate for the light distribution to the light-projected spot of the broken light source unit 63c, without unnecessarily enlarging the entirety of the light-projected spots.

Note that a plurality of means for changing the light-projected spots of the light source unit may be used in combination.

Described below is a seventh embodiment of the light-projecting device according to the present invention, with reference to FIG. 32 to FIG. 36. The present embodiment describes a light-projecting device 220 that compensates for a breakdown of a part of the light source unit with use of an auxiliary light source unit.

Note that members similar to the foregoing embodiments are provided with identical reference signs, and descriptions thereof have been omitted.

Figure 32:
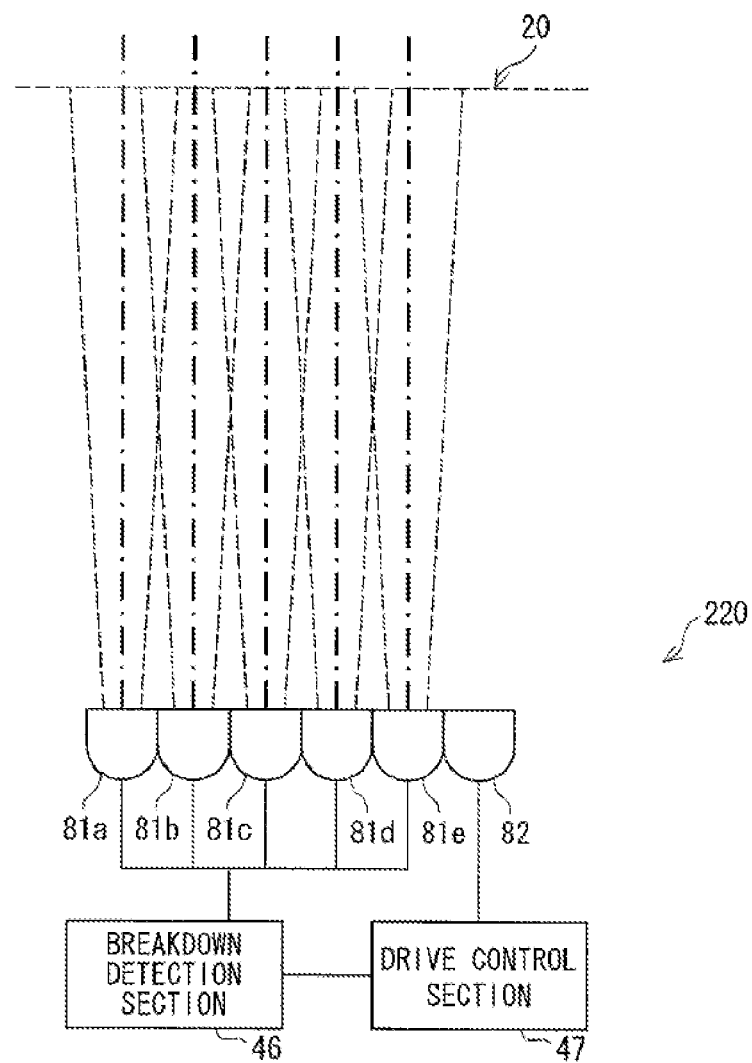
FIG. 32 is a plan view schematically illustrating a light-projecting device according to Embodiment 7.

FIG. 32 is a plan view illustrating a configuration of the light-projecting device 220 according to the present embodiment. The light-projecting device 220 includes a plurality of (in the embodiment, five) light source units 81a to 81e, and an auxiliary light source unit 82. Moreover, the light-projecting device 220 includes a breakdown detection section 46 and a drive control section 47. In FIG. 32, the breakdown detection section 46 and the drive control section 47 serve as functional blocks. Moreover, in FIG. 32, optical axes (central axes) of light distributed from the light source units 81a to 81e are shown by alternate short and long dash lines. Furthermore in FIG. 32, the range (solid angle in which the pencil of rays remain within) of light distributed from the light source units 81a to 81e are shown by broken lines. In the embodiment, as with Embodiment 5, the light-projecting device 220 is provided in the loaded vehicle so that the five light source units 81a to 81e are disposed in level.

The light source units 81a to 81e are configured substantially identical to the light source unit 1a illustrated in FIG. 3. Accordingly, the light-projected spots of the light source units 81a to 81e do not change in position and are fixed. However, the laser element provided in each of the light source units 81a to 81e includes a monitor PD.

The breakdown detection section 46 receives output of the monitor PD of the laser element of each of the light source units 81a to 81e, and detects whether or not (the laser element of) the light source units 81a to 81e is broken. The breakdown detection section 46 outputs, to the drive control section 47, the result of detecting whether or not the light source units 81a to 81e are broken.

Figure 34:
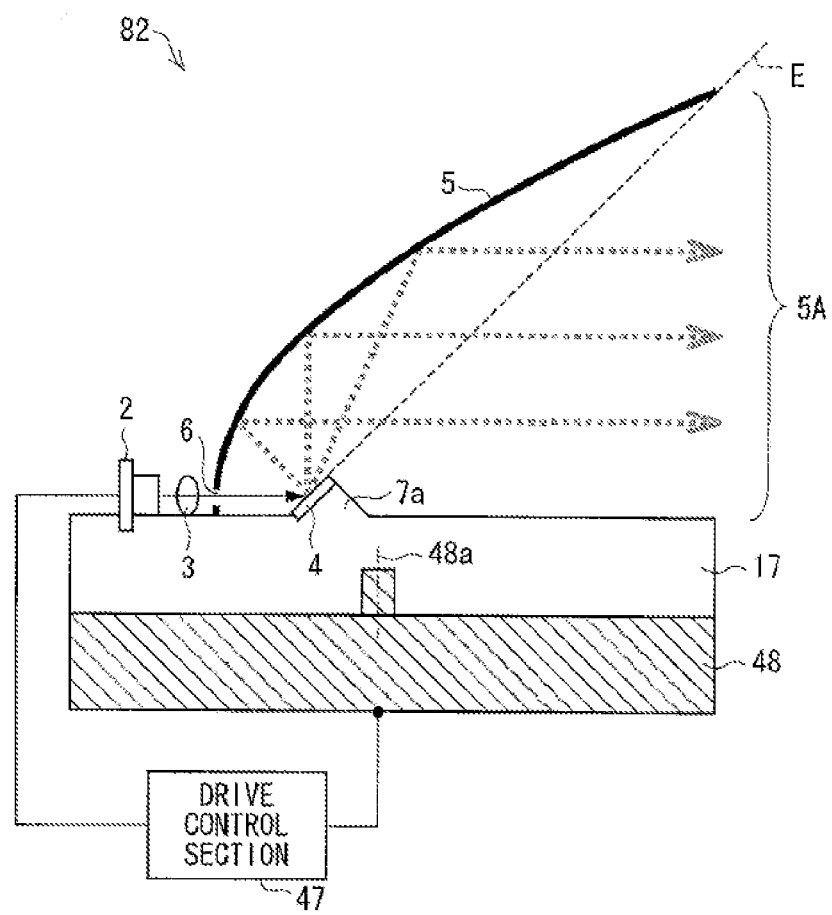
FIG. 34 is a cross sectional view schematically illustrating a configuration of an auxiliary light source unit illustrated in FIG. 32.

FIG. 34 is a cross sectional view schematically illustrating a configuration of the auxiliary light source unit 82. The auxiliary light source unit 82 includes a laser element 2, a converging lens 3, a light emitting section 4, a reflector 5, a metal base 17, and a unit drive section 48. The configuration of the converging lens 3, the light emitting section 4, the reflector 5, the metal base 17, and the unit drive section 48 are substantially identical to those of the light source unit 61a illustrated in FIG. 27. The laser element 2 of the auxiliary light source unit 82 does not necessarily need to include the monitor PD.

The drive control section 47 controls the output of the laser element 2 of the auxiliary light source unit 82 and the unit drive section 48 of the auxiliary light source unit 82, based on whether or not the light source units 81a to 81e are broken.

Figure 33:
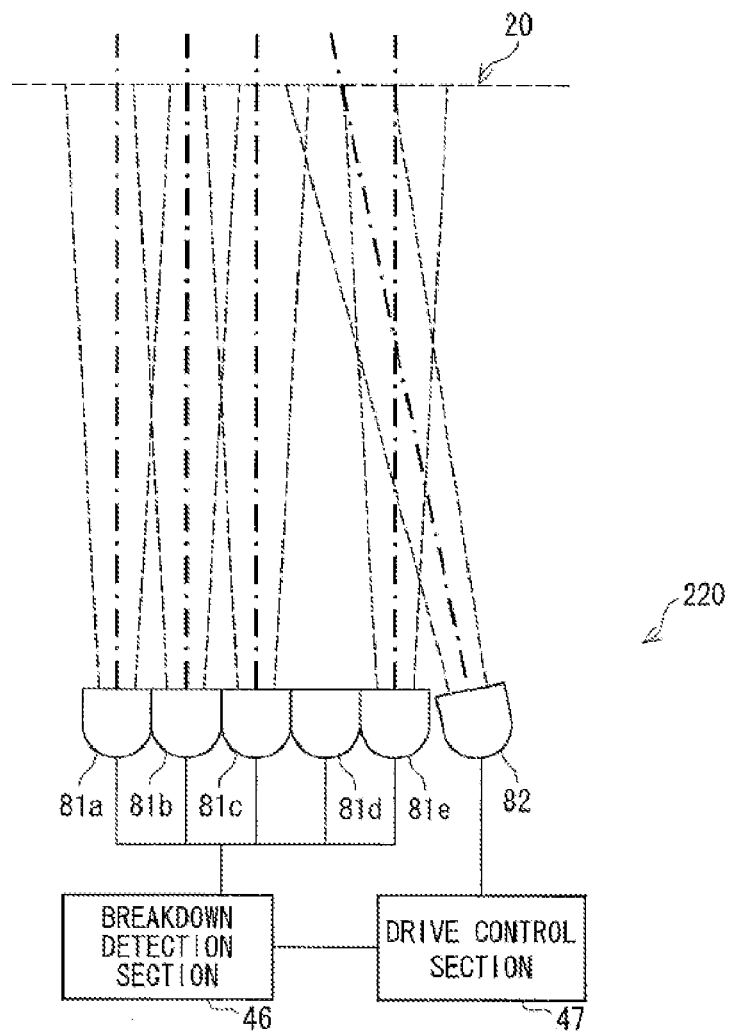
FIG. 33 is a plan view illustrating light projecting directions of the light source units in a case in which a part of the light source units is broken down in the light-projecting device illustrated in FIG. 32.

While the light source units 81a to 81e are operating normally, a predetermined region (set region) is projected with light by the light source units 81a to 81e of the light-projecting device 220, as illustrated in FIG. 32. In a case in which a part of the plurality of light source units 81a to 81e breaks, for example when the light source unit 81d breaks, the auxiliary light source unit 82 projects light to the light-projected spot of the light source unit 81d, as illustrated in FIG. 33. This compensates the distribution of light to the light-projected spot of the light source unit 81d.

For example, when no laser beam is outputted from the laser element 2 of the light source unit 81d, the breakdown detection section 46 detects the breakdown of the laser element 2 in the light source unit 81d based on the output of the monitor PD of the laser element 2 in the light source unit 81d. When the breakdown of the laser element 2 in the light source unit 81d is detected, the breakdown detection section 46 notifies the drive control section 47 that the light source unit 81d is broken.

When the light source unit 81d is broken, the drive control section 47 controls the auxiliary light source unit 82 to output a laser beam from its laser element 2 to cover up for the light-projected spot of the light source unit 81d with the auxiliary light source unit 82. Moreover, when the light source unit 81d is broken, the drive control section 47 controls the unit drive section 48 of the auxiliary light source unit 82 to rotate the auxiliary light source unit 82 and change the light-projected spot of the auxiliary light source unit 82, so as to compensate the light-projected spot of the broken light source unit 81d. The drive control section 47 stores in advance to what degree the auxiliary light source unit 82 is rotated, when the light source units are broken.

Accordingly, even if a part of the light source units in the light-projecting device 220 breaks down, the predetermined set region is projected with light by its entirety. Hence, even if a part of the light source units of the plurality of light source units 81a to 81e that are normally used in the light-projecting device 220 breaks down, it is possible to maintain the light distribution characteristics that enables safe driving, and allows for continuously driving safely. Therefore, it is possible to continue driving safely without carrying out any replacement of components.

Similarly with Embodiment 6, the light-projecting device 220 includes a plurality of light source units 81a to 81e that project light to the set region in a partitioning manner. Hence, it is possible to easily achieve an illuminated region in which illumination intensities differ every position.

The set region is projected with light in a partitioning manner by the plurality of light source units 81a to 81e. Even if one light source unit among the plurality of light source units 81a to 81e breaks, it is possible to project light to the set region in a partitioning manner by use of the other light source units and the auxiliary light source unit. Hence, it is possible to reduce the size of the light source units 81a to 81e and the auxiliary light source unit 82.

Note that a plurality of auxiliary light source units may be provided with respect to a plurality of light source units used normally, and for example a total of two on either left and right sides may be provided. In this case, the configuration may be made so that when a part of the light source unit breaks down, just the auxiliary light source unit that is closer to the broken light source unit is lighted on.

Moreover, the foregoing embodiment describes a configuration in which the breakdown detection section 46 detects whether or not the plurality of light source units is broken just for those that are normally used. However, the present invention is not limited to this, and the breakdown detection section 82 can detect whether or not the auxiliary light source unit is broken and notify the user when the breakdown of the auxiliary light source unit is detected.

The plurality of light source units included in the light-projecting device of the foregoing embodiments is not limited to the configurations described above. The following describes a modification of the light source unit.

Figure 35:
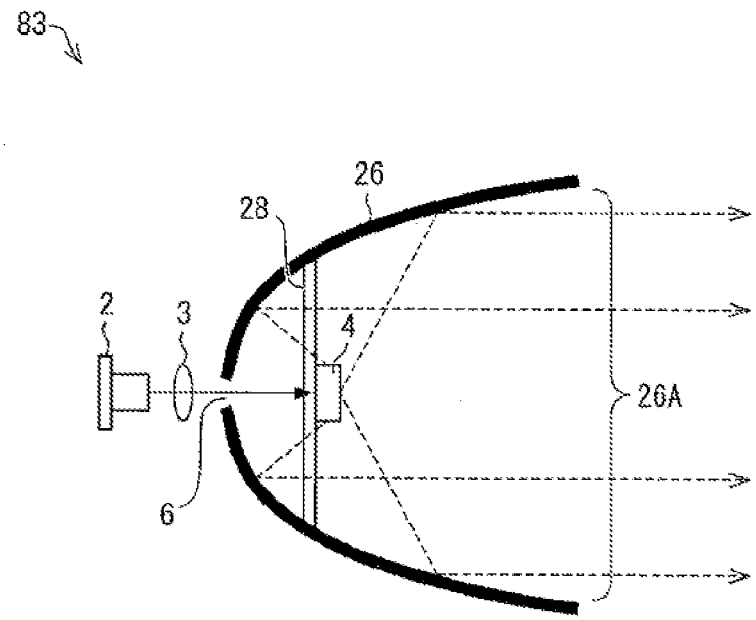
FIG. 35 is a cross sectional view schematically illustrating a configuration of a modification of the light source unit.

FIG. 35 is a cross sectional view schematically illustrating a configuration of a modification of a light source unit 83. The light source unit 83 includes a laser element 2, a converging lens 3, a light emitting section 4, a reflector 26, and a pillar 28. The configurations of the laser element 2 and the converging lens 3 are substantially identical to the light source unit 21a illustrated in FIG. 8.

In the light source unit 83 illustrated in FIG. 35, the light emitting section 4 is fixed on the pillar 28, and is disposed in a nearly focal position of the reflector 26 whose cross section is of a parabolic shape. Hence, the light irradiated from the light emitting section 4 to the reflector 26 is controlled in its optical path, by reflecting on the reflection curved surface of the reflector 26.

The reflector 26 includes at least part of a partial curved surface obtained by cross sectioning a curved surface (parabolic curved surface) obtained by rotating a parabola about a symmetry axis that serves as its rotational axis, with a plan surface including the rotational axis, and the reflector 26 has a circular shaped opening 26A in a direction in which fluorescence emitted from the light emitting section 4 is reflected.

Moreover, the laser element 2 and the converging lens 3 are disposed outside the reflector 26, and the reflector 26 has a window section 6 that allows for transmission or passing through of the laser beam. The window section 6 may be a through-hole, or may include a transparent member that can transmit through the laser beam. For example, a transparent plate on which a filter that transmits through a laser beam while reflecting white light (fluorescence of light emitting section 4) may be provided as the window section 6. With this configuration, it is possible to prevent the fluorescence emitted from the light emitting section 4 from leaking from the window section 6.

The light emitting section 4 is fixed to the pillar 28, and is disposed on a position substantially focal of the reflector 26 whose cross section is of a parabolic shape. The pillar 28 here is made of transparent material having high thermal conductivity such as sapphire, which pillar 28 is capable of transmitting the laser beam emitted from the laser element 2 and fluorescence generated by the light emitting section 4, and which can efficiently release the heat generated by the light emitting section 4.

The light emitting section 4 emits fluorescence not only from a surface (surface facing the window section 6) on which the laser beam emitted from the laser element 2 is irradiated but also from the surface opposite of the irradiated surface (surface facing the opening 6). The reflector 26 reflects light (fluorescence) emitted from the surface on which the laser beam is irradiated on the light emitting section 4 but also from the surface on the opposite side of that surface, on the reflection surface, and distributes light to a predetermined direction.

The following describes yet another modification of the light source unit.

Figure 36:
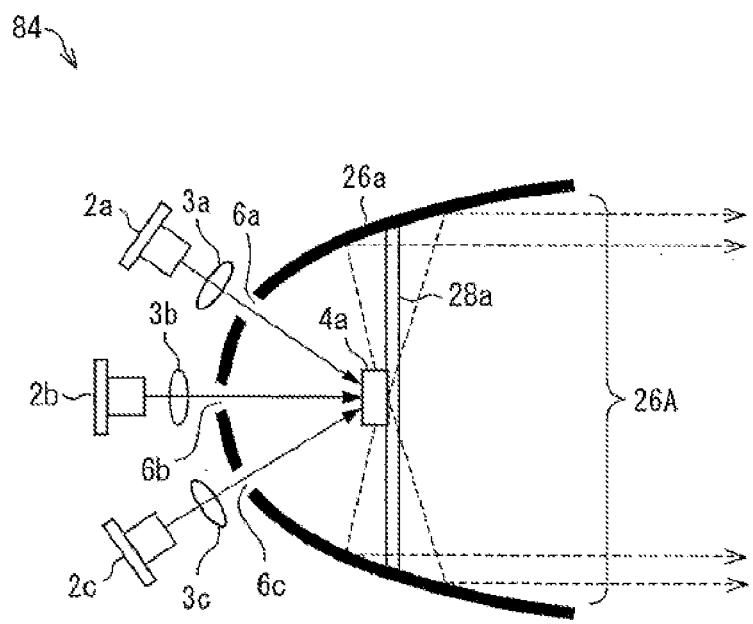
FIG. 36 is a cross sectional view illustrating a configuration of a modification of the light source unit.
Figure 37:
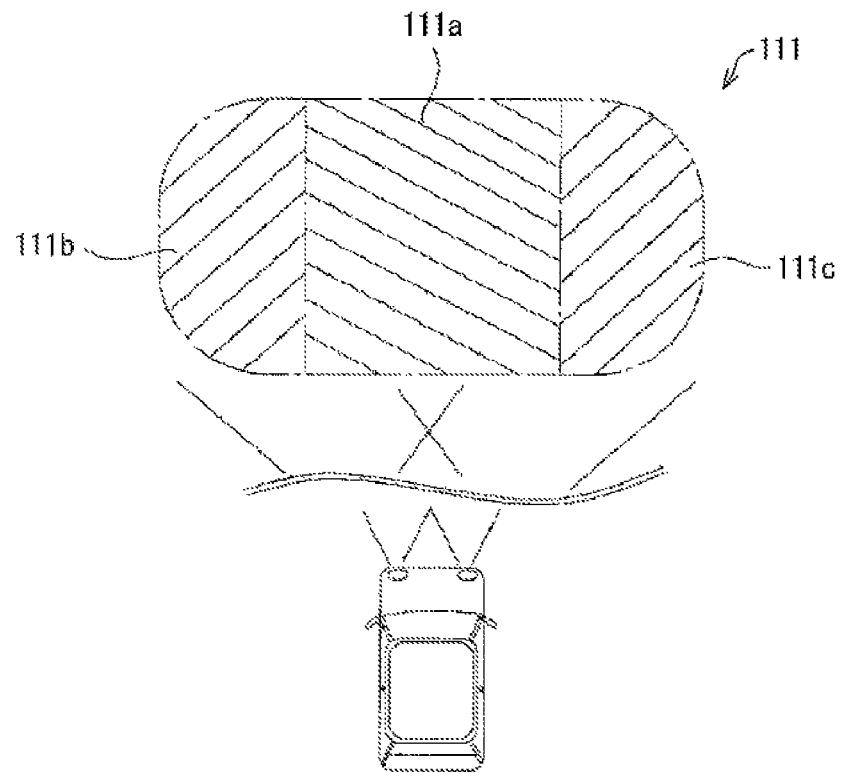
FIG. 37 is a schematic view of an illuminated region of a conventional region partitioning headlamp.
Figure 38:
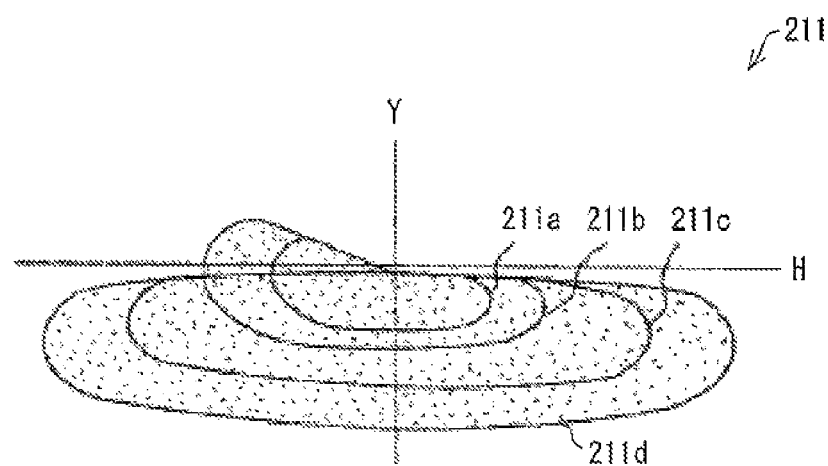
FIG. 38 is a schematic view illustrating an illuminated region of a conventional superposed headlamp.

FIG. 36 is a cross sectional view schematically illustrating a configuration of a light source unit 84 of the modification. The light source unit 84 includes a plurality of laser elements 2a, 2b, and 2c, a plurality of converging lens 3a, 3b, and 3c, a reflector 26a, and a pillar 28a and a scattering section (light emitting section) 4a. The configurations of the laser elements 2a, 2b, and 2c are identical to the configuration of the laser element 2 illustrated in FIG. 8, and the converging lens 3a, 3b, and 3c corresponding to the laser elements 2a, 2b, and 2c, respectively, are configurations identical to those of the converging lens 3 in FIG. 8.

However, the laser elements 2a, 2b, and 2c are laser elements that each emit laser beams of a different color, for example, blue, green, and red. The laser beams emitted from the laser elements 2a, 2b, and 2c each pass through their corresponding converging lens 3a, 3b, and 3c, and are emitted to the scattering section 4a.

The scattering section 4a includes a scatterer that causes the laser beam to scatter. More specifically, the scattering section 4a causes coherent laser beam to scatter, and converts this into incoherent scattered light. This configuration makes the laser beams emitted from the laser elements 2a, 2b, and 2c be scattered by the scattering section 4a, and this scattered light is emitted on a reflection surface of the reflector 26a. As such, the laser beam emitted from the laser elements 2a, 2b, and 2c is scattered by the scattering section 4a, and is projected to a predetermined direction by the reflector 26a as white light.

Moreover, in the configuration of FIG. 36, the scattering section 4a is fixed on the pillar 28a, and is disposed on a position substantially focal of the reflector 26a whose cross section is of a parabolic shape. Hence, the light emitted on the reflector 26a from the scattering section 4a is controlled in its optical path by being reflected on a reflective curved surface of the reflector 26a.

The reflector 26a includes at least part of a partial curved surface obtained by cross sectioning a curved surface (parabolic curved surface) with a plan surface including the rotational axis, which parabolic curved surface is obtained by rotating a parabola about a symmetry axis that serves as its rotational axis, and the reflector 26 has a circular shaped opening 26A in a direction in which the scattered light emitted by the scattering section 4a is reflected.

Moreover, the laser elements 2a, 2b, and 2c and the converging lens 3a, 3b, and 3c are disposed outside the reflector 26a, and the reflector 26a has a plurality of window sections 6a to 6c provided corresponding to the respective laser elements 2a, 2b and 2c and the converging lens 3a, 3b and 3c, which window sections 6a to 6c allow for transmitting or passing through a laser beam. The window sections 6a to 6c may be a through-hole, or may include a transparent member that can transmit through a laser beam. For example, a transparent plate on which a filter that transmits through a laser beam of a corresponding laser element however reflects light of other laser elements may be provided as the window sections 6a to 6c. With this configuration, it is possible to prevent the light scattered from the laser beam of the other laser elements from leaking from the window sections 6a to 6c.

The pillar 28a is made of transparent material having high thermal conductivity such as sapphire, and is capable of transmitting the laser beam emitted from the laser elements and light scattered by the scattering section 4a and further can efficiently release heat generated in the scattering section 4a.

Note that the number of laser elements and the color of the laser beams emitted from the laser elements are not limited to the foregoing. For example, with the number of laser elements as two and the color of the emitted laser beams as blue and yellow, white light can be obtained.

SUMMARY OF THE INVENTION

As described above, a light-projecting device according to the present invention includes a plurality of light source units each including (i) a light emitting section that emits light upon receiving light and (ii) a light distribution section provided corresponding to the light emitting section, the light distribution section distributing light from the light emitting section to a part of an illuminated region, each of the light source units projecting light from the light emitting section to a corresponding light-projected region, the light-projected region being a partitioned region of the illuminated region, and the illuminated region being formed by combining a plurality of the light-projected region to which light is projected from a corresponding one of the light source units.

In the foregoing configuration, the light source unit includes a light emitting section that emits light upon receiving light. Hence, it is possible to reduce the size of the light emitting section, and is capable of making the size of the light emitting section with respect to the size of the light distribution section relatively small. This enables achievement of high light distribution characteristics even with use of a light distribution section having a small diameter. Accordingly, each of the light source units is capable of projecting light from the light emitting section to a small region, and thus is possible to reduce the size of the device configuration.

The light-projecting device according to the present invention includes a plural number of such a light source unit, and each of the light source units projects the light from the light emitting section to light-projected regions that are regions formed by partitioning the illuminated region. Namely, each of the light source units projects the light from the light emitting section to different regions of the illuminated region.

Hence, by combining a plurality of the small light-projected regions to which light is projected by respective light source units, it is possible to form a desired illuminated region.

Moreover, according to the configuration, each of the light source units can selectively project the light to a light-projected region independent every unit. This prevents the generation of an unnecessary luminous flux, thereby allowing for efficient light projection.

Hence, according to the present invention, it is possible to achieve a light-projecting device that is capable of efficiently forming a desired illuminated region.

Moreover, the light-projecting device according to the present invention may be configured so as to further include a light quantity control section capable of individually controlling a quantity of light of the plurality of light source units.

The foregoing configuration further includes a light quantity control section that is capable of individually controlling the quantity of light (illumination intensity) of the plurality of light source units. Accordingly, by controlling the quantity of light for every light source unit, it is possible to control the quantity of light for every light-projected region that corresponds to the light source units.

Therefore, according to the configuration, optimum control of the quantity of light for every region is possible of the illuminated region, such as sufficiently illuminating a region that is desirably made bright or making a region dark for a region that is inconvenient if it is too bright.

Moreover, the light-projecting device according to the present invention may be configured so as to further include an object detection section that detects an object inside the light-projected region, the light quantity control section controlling the quantity of light of the light source unit, to be projected to the light-projected region in which the object is detected by the object detection section.

The foregoing configuration further includes an object detection section that detects an object inside the light-projected region. Accordingly, the light quantity control section is capable of controlling the quantity of light to be projected to an object, by controlling the quantity of light of the light source unit to be projected to the light-projected region, in which region the object is detected by the object detection section.

Hence, according to the configuration, it is possible to control the quantity of light such as increasing or decreasing the quantity of light to be projected to the detected object.

Moreover, the light-projecting device according to the present invention may be configured so as to further include an identification section that identifies, by image recognition, a kind of the object detected by the object detection section, the light quantity control section, in response to the kind of the object identified by the identification section, controlling the quantity of light of the light source unit, to be projected to the light-projected region in which the object is detected.

The foregoing configuration further includes an identification section that identifies, by image recognition, what kind the object detected by the object detection section is. Hence, it is possible to control the quantity of light projected to the object in accordance with the kind of the object identified by the identification section.

Hence, according to the configuration, it is possible to control the quantity of light such as increasing or decreasing the quantity of light to be projected, in response to the kind of object.

Moreover, the light-projecting device according to the present invention may be configured in such a manner that the plurality of light source units project light to the illuminated region in a manner partitioning the illuminated region at least in a sideways direction.

In the foregoing configuration, the plurality of light source units project light to the illuminated region in a manner partitioning the illuminated region at least in a sideways direction. This allows for easily controlling a width of the illuminated region, and allows for optimally controlling the quantity of light for every region divided in a width direction.

Moreover, the light-projecting device according to the present invention may be configured in such a manner that the plurality of light source units project light to the illuminated region in a manner partitioning the illuminated region in a vertical direction.

In the foregoing configuration, the plurality of light source units projects light to the illuminated region in a partitioning manner, in a sideways direction and in a vertical direction. Hence, it is possible to suitably form an illuminated region of various shapes by combining the light-projected regions.

Furthermore, according to the configuration, it is possible to optimally control the quantity of light for every region of the illuminated region partitioned in the width direction and height direction.

Moreover, it is preferable that the light-projecting device according to the present invention is configured in such a manner that the illuminated region includes a predetermined set region, and a region in the set region that is included in a light-projected region of a first light source unit out of the plurality of light source units, overlaps a light-projected region of any other one of the light source units.

In the configuration, the illuminated region includes a predetermined set region, and a region of the set region included in a light-projected region of a first light source unit out of the plurality of light source units overlaps a light-projected region of any other one of the light source units.

Hence, according to the configuration, even in a case in which no light distribution is carried out from the first light source unit due to a breakdown or the like, it is possible to illuminate the set region by any other one of the light source units. This allows for securing a desired light-projected region.

Moreover, the light-projecting device according to the present invention may be configured in such a manner that the light-projected region of the first light source unit has its center position be included in a light-projected region of any other one of the light source units.

Moreover, the light-projecting device according to the present invention may be configured in such a manner that the set region is included in light-projected regions of other plurality of light source units, the other plurality of light source units excluding the first light source unit from the plurality of light source units.

Moreover, the light-projecting device according to the present invention may be configured in such a manner that the plurality of light source units include a plural number of the first light source unit.

Moreover, it is preferable that the light-projecting device according to the present invention is configured in such a manner that the illuminated region includes a predetermined set region, the light-projecting device further including: a light projection changing section that enables a light-projected region of a first light source unit out of the plurality of light source units to be changed, while the projection of light from a second light source unit out of the plurality of light source units is carried out normally, the plurality of light source units including the first light source unit and the second light source unit projecting light to the set region in a partitioning manner, and while the projection of light from the second light source unit out of the plurality of light source units is not carried out normally, the light-projected region of the first light source unit is changed by the light projection changing section so that at least a part of the light-projected region of the second light source unit is projected with light.

According to the configuration, the light projection changing section allows for changing the light-projected region, which light-projected region is obtained by projecting light from the first light source unit. Hence, even in a case in which the projection of light from a second light source unit is not normally carried out caused by occurrence of a breakdown or the like, it is possible to change the light-projected region of the first light source unit and compensate the projection of light to the light-projected region of the second light source unit and project light to the set region. As a result, it is possible to secure the desired light-projected region.

Moreover, the light-projecting device according to the present invention may further include a light projection detection section that detects whether or not the projection of light from the second light source unit is carried out normally, wherein when the light projection detection section detects that the projection of light from the second light source unit is not carried out normally, the light projection changing section changes the light-projected region of the first light source unit so that at least a part of the light-projected region of the second light source unit is projected with light.

Moreover, the light-projecting device according to the present invention may be configured in such a manner that the light projection changing section changes the light-projected region of the first light source unit by rotating or moving the light distribution section provided in the first light source unit.

Moreover, the light-projecting device according to the present invention may be configured in such a manner that the light projection changing section changes the light-projected region of the first light source unit by changing an irradiated position of light that is emitted to the light emitting section provided in the first light source unit.

Moreover, the light-projecting device according to the present invention may be configured in such a manner that the light projection changing section changes the light-projected region of the first light source unit by changing an irradiated range of light that is emitted on the light emitting section provided in the first light source unit.

Moreover, the light-projecting device according to present invention may be configured in such a manner that the first light source unit is disposed adjacent to the second light source unit, and when the projection of light from the second light source unit is not carried out normally, the light projection changing section changes the light-projected region of one or a plurality of the first light source unit(s) disposed adjacent to the second light source unit so that at least a part of the light-projected region of the second light source unit is projected with light.

Moreover, it is preferable that the light-projecting device according to the present invention is configured in such a manner that the illuminated region includes a predetermined set region, the light-projecting device further including: a light projection detection section that detects whether or not the distribution of light of other plurality of light source units excluding a first light source unit out of the plurality of light source units is normally carried out, wherein when the projection of light by the other plurality of light source units excluding the first light source unit is carried out normally, the first light source unit projects no light and the other plurality of light source units project light to the set region in a partitioning manner, and when the light projection detection section detects that the projection of light by any one light source unit out of the other plurality of light source units is not carried out normally, the first light source unit projects light to at least a part of the light-projected region of that light source unit by which the projection of light is not normally carried out.

Moreover, the light-projecting device according to the present invention may be configured so as to further include a light radiating section that radiates light to be received by the light emitting section, the light emitting section scattering the light received from the light radiating section.

Moreover, the light-projecting device according to the present invention may be configured so as to further include a light radiating section that radiates excitation light as light to be received by the light emitting section, the light emitting section emitting light by being excited by the excitation light received from the light radiating section.

Moreover, the light-projecting device according to the present invention may be configured in such a manner that the light emitting section at least contains fluorescent material that emits fluorescence upon receiving the excitation light.

According to the configuration, the light emitting section at least contains fluorescent material that emits fluorescence upon receiving excitation light. Hence, it is possible to use the fluorescence emitted by the fluorescent material as illumination light. Moreover, by containing various kinds of fluorescent material in the light emitting section, it is possible to emit fluorescence of various colors, and generate illumination light of a desired color.

Moreover, the light-projecting device according to the present invention may be configured in such a manner that the light radiating section radiates a laser beam.

According to the configuration, it is possible to scatter a laser beam received from the light radiating section by the light emitting section and use this as illumination light. Alternatively, it is possible to efficiently excite the light emitting section with use of the laser beam.

Furthermore, in the configuration, it is possible to reduce the size of the irradiated range of the light emitting section to which the laser beam is radiated. Hence, it is possible to make the size of the light emitting section with respect to the size of the light distribution section relatively small.

A vehicle headlamp according to the present invention includes the light-projecting device.

According to the configuration, the vehicle headlamp includes the light-projecting device. Hence, it is possible to accomplish a vehicle headlamp that can efficiently form a desired illuminated region.

A vehicle headlamp according to the present invention is a vehicle headlamp including the light-projecting device, wherein when the identification section identifies that the object is an oncoming vehicle or a leading vehicle, the light quantity control section reduces the quantity of light of the light source unit that is projected to the light-projected region in which the oncoming vehicle or the leading vehicle is detected.

According to the configuration, when the object detected by the object detection section is identified as an oncoming vehicle, a leading vehicle or the like, the light quantity control section controls the light source unit and reduces the quantity of light that is projected to the oncoming vehicle, the leading vehicle or the like.

Hence, according to the configuration, it is possible to reduce the uncomfortable glairiness and dazzling given to the driver or the like of the oncoming vehicle or leading vehicle. As a result, it is possible to achieve a safe and comfortable traffic environment.

Moreover, the vehicle headlamp according to the present invention may be configured in such a manner that when the identification section identifies that the object is a traffic sign or an obstacle, the light quantity control section increases the quantity of light of the light source unit to be projected to the light-projected region in which the traffic sign or the obstacle is detected.

According to the configuration, when the detected object is identified as a traffic sign, an obstacle or the like, the light quantity control section increases the quantity of light that is projected to the traffic sign, the obstacle or the like.

Hence, with the configuration, it becomes possible to accurately read a traffic sign and recognize an obstacle or the like by eyesight, by illuminating the traffic sign, obstacle or the like brightly. As a result, it is possible to achieve a safe traffic environment.

A vehicle headlamp according to the present invention is a vehicle headlamp including the light-projecting device, wherein when the identification section identifies the object as a pedestrian, a light vehicle, or a motorcycle, the light quantity control section makes the light source unit that projects light to the light-projected region in which the pedestrian, the light vehicle, or the motorcycle is detected, to blink.

In the configuration, when the object detected by the object detection section is identified as a pedestrian, a light vehicle, or a motorcycle, the light quantity control section controls the light source unit and makes the light projected to the pedestrian, the light vehicle, or the motorcycle to blink.

Therefore, according to the configuration, it is possible to attract attention of the pedestrian and the like to an approaching vehicle that has the light-projecting device, without providing excess glairiness to the pedestrian or the like, while also, notifying to a driver of the vehicle, of the pedestrian or the like. As a result, it is possible to achieve a safe traffic environment.

Moreover, the vehicle headlamp according to the present invention may be configured in such a manner that the light quantity control section makes the light source unit blink with a frequency of not less than 1 Hz but not more than 10 Hz.

According to the configuration, by having the frequency with which the light source unit is made to blink be not less than 1 Hz but not more than 10 Hz, it becomes more easy for the pedestrian, the driver or the like to recognize the blinking of the light source unit.

Hence, according to the configuration, it is possible to effectively notify the pedestrian, the driver or the like of the approaching of a vehicle or the presence of a pedestrian or the like.

Moreover, the vehicle headlamp according to the present invention may be configured to further include a distance detection section that detects a distance between (a) the pedestrian, the light vehicle, or the motorcycle and (b) the vehicle in which the light-projecting device is provided, the light quantity control section raising the frequency with which the light source unit is made to blink, as the distance detected by the distance detection section becomes shorter.

According to the configuration, as the distance detected by the distance detection section becomes shorter, the light quantity control section raises the frequency with which the light source unit is made to blink. Hence, it is possible to effectively notify the pedestrian, the driver or the like of the approach of a vehicle or the presence of a pedestrian.

The vehicle headlamp according to the present invention is a vehicle headlamp including the light-projecting device, wherein the illuminated region includes (i) a first illuminated region and (ii) a second illuminated region positioned in the vicinity of a left side and a right side of the first illuminated region, and the light quantity control section controls on and off of the lighting of the light source unit that projects light to the second illuminated region in accordance with a traveling condition including a traveling speed or a traveling direction of the vehicle in which the light-projecting device is provided.

According to the configuration, the light quantity control section controls the on and off of the light source unit that projects light to the second illuminated region positioned in the vicinity of a left side and a right side of the first illuminated region, in accordance with traveling conditions including traveling speed or a traveling direction of the vehicle on which the light-projecting device is loaded.

Hence, with the configuration, it is possible to carry out control in accordance with the traveling conditions, such as by illuminating the second illuminated region to illuminate a broad range. This thus achieves a safe driving environment, and further reduces electricity consumption of the vehicle headlamp.

Moreover, the vehicle headlamp according to the present invention may be configured in such a manner that when the traveling speed of the vehicle is not more than a predetermined speed, the light quantity control section controls to light on the light source unit that projects light to the second illuminated region.

In the foregoing configuration, when the traveling speed of the vehicle is not more than a predetermined speed, the light quantity control section lights on the light source units that project light to the second illuminated region. This allows for illuminating a broad range by illuminating the second illuminated region. Hence, it is possible to switch between states, for example in a case of traveling at a low speed in the urban area or the like, the light source units that project light to the second illuminated region are lighted on to illuminate a broad range including around the forward direction of the vehicle, and on the other hand, in a case of traveling at a high speed on an expressway or the like, the light source units that project light to the second illuminated region is lighted off, to just illuminate the forward direction of the vehicle.

Hence, according to the configuration, it is possible to illuminate a necessary range in accordance with the traveling speed of the vehicle. Accordingly, it is possible to achieve both a safe driving environment and a reduction in electricity consumption of the vehicle headlamp.

Moreover, the vehicle headlamp according to the present invention may be configured in such a manner that when the vehicle turns left or right, the light quantity control section controls to light on the light source unit that projects light to the second illuminated region positioned on a side in the direction that the vehicle is to turn.

In the configuration, when the vehicle turns left or right, the light quantity control section controls to light on the light source unit that projects light to the second illuminated region positioned in a side of the direction in which that vehicle turns. Hence, it is possible to broaden the range that the light is illuminated, on a side in the direction to which the vehicles turns.

Hence, according to the configuration, it is possible to illuminate the direction to which the vehicle turns, in response to the traveling direction of the vehicle. This allows for improving the visibility of the driver, and thus achieves a safe driving environment.

Moreover, the vehicle headlamp according to the present invention may be configured to further include an operation detection section that detects a direction of a handle operation of the driver, the light quantity control section lighting on the light source unit, in response to the direction of the handle operation detected by the operation detection section.

According to the configuration, the vehicle headlamp further includes an operation detection section that detects a direction of a handle operation by the driver. This hence allows for detecting a direction that the vehicle is to turn, based on the handle operation by the driver.

A vehicle headlamp according to the present invention is a vehicle headlamp including the light-projecting device, and may be configured in such a manner that the set region is set based on a light distribution characteristics standard for a vehicle headlamp in which the light-projecting device is provided, and the light-projecting device projects light to the set region so that the light distribution characteristics standard is satisfied.

The light-projecting device according to the present invention can be expressed as described below. Namely, a light-projecting device according to the present invention is a light-projecting device that uses, as a light source, fluorescent material excited by laser, and projects light with use of light-projecting means (reflector, lens), the light-projecting device including: a plurality of light-projecting means, each of the light-projecting means projecting light to different regions to achieve a desired light distribution.

Moreover, the light-projecting device according to the present invention is a light-projecting device that uses a plurality of high-intensity light sources, and may be configured to project light to an irradiated area in a partitioning manner with use of a plurality of light-projecting means.

Moreover, the light-projecting device according to the present invention may be configured further including means for monitoring an illuminated region, wherein the illuminated region has the quantity of light be increased or decreased at a part of the partitioned illuminated region, in response to a result of monitoring the illuminated region.

Moreover, the light-projecting device according to the present invention is a light-projecting device that projects light to a predetermined region, the light-projecting device including: a plurality of irradiation sections; and a plurality of light distribution sections provided corresponding to the irradiation sections, respectively, each of the plurality of light distribution sections distributing, in a predetermined direction, light emitted from its corresponding irradiation section, the plurality of light distribution sections projecting light to the predetermined region in a partitioning manner, a region being a light-projected region generated as a result of light distribution from a first light distribution section out of the plurality of light distribution sections and being the predetermined region, overlapping a light-projected region generated as a result of light distribution from any another light distribution section.

According to the configuration, the predetermined region is projected with light in the partitioning manner by the plurality of the light distribution sections. Hence, it is possible to reduce the size of the individual light distribution sections, and the quantity of light to be projected for every position is easily adjusted, thereby being able to efficiently achieve desired light distribution characteristics. Moreover, a region that is a light-projected region generated as a result of light distribution from the first light distribution section and that is the predetermined region overlaps a light-projected region generated by the distribution of light from any another light distribution section. Hence, even in a case in which no light is distributed from the first light distribution section due to a breakdown thereof or the like, it is possible to project light to the predetermined region to secure the desired light-projected region.

Moreover, the plurality of light distribution sections may be configured so as to include a plurality of the first light distribution sections.

Moreover, the light-projecting device may be configured in such a manner that the light-projected region generated as a result of the light distribution from the first light distribution section has its center position be included in the light-projected region generated as a result of the light distribution of the any another light distribution section.

Moreover, the light-projecting device may be configured in such a manner that the predetermined region is included in any another light-projected region generated as a result of light distribution from any other plurality of light distribution sections other than the first light distribution section out of the plurality of light distribution sections.

Moreover, the light-projecting device may be configured in such a manner that the predetermined region is projected with light in a partitioning manner, in a sideways direction and/or a vertical direction, by the plurality of light distribution sections.

The light-projecting device of the present invention is a light-projecting device that projects light to a predetermined region, the light-projecting device including: a plurality of irradiation sections; a plurality of light distribution sections provided corresponding to respective ones of the irradiation sections, each of the light distribution sections distributing, in a predetermined direction, light emitted from its respective irradiation section; and a light projection changing section that enables changing of a light-projected region generated by distribution of light from a first light distribution section out of the plurality of light distribution sections, wherein when the distribution of light is carried out normally from a second light distribution section out of the plurality of light distribution sections, the plurality of light distribution sections including the first light distribution section and the second light distribution section projects light to the predetermined region in a partitioning manner, and when the distribution of light is not carried out normally from the second light distribution section out of the plurality of light distribution sections, at least a part of the light-projected region of the second light distribution section is projected with light by changing the light-projected region of the first light distribution section with the light projection changing section.

According to the configuration, the predetermined region is projected with light in a partitioning manner, with a plurality of light distribution sections. Hence, it is possible to reduce the size of the individual light distribution sections, which makes it easier to adjust the quantity of light projected for every position, thereby being able to efficiently obtain the desired light distribution characteristics. Moreover, with the light projection changing section, it is possible to change the light-projected region, which is generated as a result of the distribution of light from the first light distribution section. Hence, even in a case in which the distribution of light is not carried out normally from the second light distribution section due to a breakdown thereof or the like, it is possible to change the light-projected region of the first light distribution section and project light to the predetermined region by compensating the distribution of light to the light-projected region of the second light distribution section, hence being able to secure a desired light-projected region.

Moreover, the light-projecting device may be configured so as to further include a detection section that detects whether or not the distribution of light from the second light distribution section is carried out normally, wherein when the detection section detects that the distribution of light from the second light distribution section is not carried out normally, the light projection changing section changes the light-projected region of the first light distribution section so that at least a part of the light-projected region of the second light distribution section is projected with light.

Moreover, the light projection changing section may be configured so as to change the light-projected region by rotating or moving the first light distribution section.

Moreover, the light-projecting device further includes a light radiating section that radiates light, wherein the irradiation section emits light to the light distribution section upon receiving the light emitted from the light radiating section, and the light projection changing section changes the light-projected region of the first light distribution section by changing an irradiated position of light received from the light radiating section, on the irradiation section corresponding to the first light distribution section.

Moreover, the light-projecting device further includes a light radiating section that radiates light, wherein the irradiation section emits light to the light distribution section upon receiving the light emitted from the light radiating section, and the light projection changing section changes the light-projected region of the first light distribution section by changing an irradiated range of light received from the light radiating section, on the irradiation section corresponding to the first light distribution section.

Moreover, the configuration may be one in which the first light distribution section is disposed adjacent to the second light distribution section, and when distribution of light is not normally carried out from the second light distribution section, light is projected to at least a part of the light-projected region of the second light distribution section by the light projection changing section changing the light-projected region of one or a plurality of the light distribution section disposed adjacent to the second light distribution section.

The light-projecting device of the present invention is a light-projecting device that projects light to a predetermined region, the device including: a plurality of irradiation sections; a plurality of light distribution sections that are each provided corresponding to a respective one of the irradiation sections, each of the light distribution sections distributing light emitted from its corresponding irradiation section in a predetermined direction; and a detection section that detects whether or not distribution of light from other plurality of light distribution sections excluding the first light distribution section out of the plurality of light distribution sections is carried out normally, wherein when the distribution of light from the other plurality of light distribution sections excluding the first light distribution section is carried out normally, the first light distribution section projects no light and the other plurality of light distribution sections project light to the predetermined region in a partitioning manner, and when the detection section detects that the distribution of light from any one of the light distribution sections out of the other plurality of light distribution sections is not carried out normally, the first light distribution section projects light to at least a part of the light-projected region of the light distribution section in which the distribution of light is not carried out normally.

According to the configuration, a predetermined region is projected with light in a partitioning manner, by a plurality of light distribution sections (excluding a first light distribution section). Hence, it is possible to reduce the size of each individual light distribution section, which makes it easier to adjust the quantity of light projected every position and makes it possible to efficiently obtain desired light distribution characteristics. Moreover, when any one of the light distribution section is in an abnormal state, the first light distribution section projects light to the light-projected region of the light distribution section in the abnormal state. Hence, even in a case in which for example the normally used plurality of light distribution sections excluding the first light distribution section or its corresponding irradiation section breaks down, the first light distribution section projects light instead. Hence, it is possible to secure the desired light-projected region.

Moreover, the light-projecting device may include a light radiating section that radiates excitation light, the irradiation section emitting light by being effected by the excitation light received from the light radiating section.

Moreover, the configuration may be one in which the light radiating section radiates laser, and the irradiation section emits light by being excited by the laser.

Moreover, the light-projecting device may be one including a light radiating section that radiates light, the irradiation section scattering the light that is received from the light radiating section.

Moreover, the light radiating section may be configured to radiate a laser, the irradiation section scattering the laser.

Moreover, a vehicle headlamp of the present invention may be configured to include the light-projecting device, wherein the predetermined region is set with a light distribution characteristics standard for a vehicle headlamp, and the light-projecting device projects light to the predetermined region so that the light distribution characteristics standard is satisfied.

The present invention is suitably used for various illumination devices, in particular for a vehicle headlamp, which present invention enables improvement of light distribution characteristics of these various illumination devices.

REFERENCE SIGNS LIST 1 light source unit (a plurality of light source units)
1a to 1e light source unit
2 laser element (light radiating section)
4 light emitting section
4a scattering section (light emitting section)
5 reflector (light distribution section)
5a to 5i reflector (light distribution section)
7 metal base
7a slope section
11 to 14 illuminated region
11a to 11i light-projected spot (light-projected region)
17 metal base
20 master flat plane
21a to 21f light source unit
25 reflector (light distribution section)
25a to 25i reflector (light distribution section)
26 reflector (light distribution section)
26a reflector (light distribution section)
28 pillar
28a pillar
31 illuminated region
31A illuminated region (first illuminated region)
31B illuminated region (second illuminated region)
31C illuminated region (second illuminated region)
31a to 31f light-projected spot (light-projected region)
35 reflector (light distribution section)
41 object detection section
41a to 41e light source unit
42 identification section
43 light quantity control section
44 distance detection section
45 handle operation detection section (operation detection section)
46 breakdown detection section (light projection detection section)
47 drive control section (light projection changing section)
48 unit drive section (light projection changing section)
49 optical element (light projection changing section)
51 illuminated region
61a to 61e light source unit
62 light source unit
63a to 63e light source unit
81a to 81e light source unit
82 auxiliary light source unit
100 light-projecting device (vehicle headlamp)
120 light-projecting device (vehicle headlamp)
140 light-projecting device (vehicle headlamp)
160 light-projecting device (vehicle headlamp)
180 light-projecting device (vehicle headlamp)
200 light-projecting device (vehicle headlamp)
A to D set region
D1 to D4 partial region
F oncoming vehicle (object)
M loaded vehicle (vehicle)
P pedestrian (object)

What is claimed is:

1. A light-projecting device, comprising:
a plurality of light source units each including (i) a light source and (ii) a light distribution section provided corresponding to the light source,
the plurality of light source units including a first light source unit illuminating a more distant place than another light source unit,
the first light source unit including, as the light source, a light emitting section which (i) contains fluorescent material that emits fluorescence upon receiving a laser beam and (ii) emits light at a brightness of not less than 200 cd/mm$^2$,
the first light source unit illuminating a part of an illuminated region illuminated by the light-projecting device,
the first light source unit (i) illuminating an object captured by a camera for capturing a range including the illuminated region and (ii) blinking light illuminating the object with a blink frequency of not less than 1 Hz and not more than 10 Hz.

2. The light-projecting device according to claim 1, wherein the object is a pedestrian, a light vehicle, or a motorcycle.

3. The light-projecting device according to claim 1, wherein the first light source unit raises the frequency with which to blink the light illuminating the object, as a distance between the light-projecting device and the object becomes shorter.

4. A vehicle headlamp, comprising the light-projecting device according to claim 1.

* * * * *